(12) United States Patent
Yamauchi et al.

(10) Patent No.: US 7,280,739 B2
(45) Date of Patent: Oct. 9, 2007

(54) REPRODUCED IMAGE TRANSMITTING APPARATUS

(75) Inventors: Kenichiro Yamauchi, Nagaokakyo (JP); Yoshiki Kuno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1096 days.

(21) Appl. No.: 10/158,185

(22) Filed: May 31, 2002

(65) Prior Publication Data

US 2003/0014760 A1   Jan. 16, 2003

(30) Foreign Application Priority Data

Jun. 1, 2001   (JP)   ............... 2001-166818

(51) Int. Cl.
*H04N 5/91*   (2006.01)

(52) U.S. Cl. .......................... 386/68; 386/66

(58) Field of Classification Search ................ 386/46, 386/66, 68, 81, 82; 364/265.2, 944, 265, 364/265.1; 358/406, 462, 502, 504; 714/5, 714/18, 712, 713, 822, 746–751
See application file for complete search history.

(56) References Cited

U.S. PATENT DOCUMENTS 6,018,816 A * 1/2000 Tateyama ................. 714/746
6,556,546 B1   4/2003 Maeda et al. ............... 370/282

FOREIGN PATENT DOCUMENTS

| CN | 1210411 | 3/1999 |
|---|---|---|
| EP | 0 833 514 A2 | 4/1998 |
| EP | 1 052 851 A1 | 11/2000 |
| EP | 1 102 484 A1 | 5/2001 |
| JP | 2000041218 A | 2/2000 |
| JP | 2000-217067 | 8/2000 |
| JP | 2001-119660 | 4/2001 |
| WO | WO 00/24196 | 4/2000 |

\* cited by examiner

*Primary Examiner*—Thai Q. Tran
*Assistant Examiner*—Mishawn Dunn
(74) *Attorney, Agent, or Firm*—Steptoe & Johnson LLP

(57) ABSTRACT

A reproduced image transmission apparatus which can display reversely reproduced images normally even when the transfer order of asynchronous transfer and isochronous transfer is not ensured on IEEE1394, in cases where an apparatus for generating the reversely reproduced images and an apparatus for decoding the reversely reproducing images are connected with each other via an IEEE1394 network. An MPEG transport stream processing means 15 embeds control signal for controlling decoding in an MPEG picture, and transmits the signal together with the MPEG picture through the IEEE1394 network in the isochronous transfer mode, whereby the synchronization between the MPEG picture and its control signal is surely obtained, thereby to generate reversely reproduced images according to MPEG using P and B pictures.

2 Claims, 22 Drawing Sheets

Fig.10

| | Command A | Command B | Command C | Command D |
|---|---|---|---|---|
| Meaning | perform decoding display picture | perform decoding keep previous displayed picture | not perform decoding clear displayed picture | not perform decoding keep previous displayed picture |
| trick_mode_control | 3'b101 | 3'b101 | 3'b101 | 3'b101 |
| DSM_data | 5'b01000 | 5'b01001 | 5'b01010 | 5'b01011 |

Fig.16

| | Command A | Command B | Command C | Command D |
|---|---|---|---|---|
| Meaning | perform decoding display picture | perform decoding keep previous displayed picture | | |
| trick_mode_control | 3'b100 | 3'b100 | | |
| DSM_data | rep_cntrl ≠ 5'b00000 | rep_cntrl = 5'b00000 | | |

REPRODUCED IMAGE TRANSMITTING APPARATUS

FIELD OF THE INVENTION

The present invention relates to an image reproduction system that transmits MPEG images which are stored in a hard disk included in a transmission apparatus, to a receiving apparatus via a bidirectional network according to IEEE1394 or the like. More particularly, this invention relates to a reproduced image transmitting system in which reversely reproduced images are generated with employing P or B pictures in the receiving apparatus.

BACKGROUND OF THE INVENTION

In recent years, as speeds of networks have increased and capacities of hard disks have been expanded, a system has come out which stores digital images recorded according to MPEG or the like, in a hard disk, and transmits the stored digital images to a receiver via a network. This video network system employs a high-speed network based on IEEE1394. A storage device including a hard disk is connected via this network with a reproduction apparatus which receives data to reproduce video images.

IEEE1394 has an isochronous transfer function that ensures the amount of data which are transferred during a prescribed time period. Because the isochronous transfer ensures the amount of data transferred during the prescribed time period, this is suitable for transmission of video or audio which requires a real time property, and mounted on a large number of STBs of BS digital broadcast in Japan or digital VCR apparatuses.

IEEE1394 further has an asynchronous transfer function for transferring data or commands. This asynchronous transfer is of a mode in which the right to use a bus is obtained to transmit data when desiring to transmit data, whereby the amount of data transferred during a prescribed time period is not ensured.

At present, detailed commands are defined in IEEE1394 by DVB (Digital Video Broadcasting Project), IEEE1394 T.A. (Trade Association), and the like. Particularly according to IEEE1394 T.A., formats of MPEG transport streams to be transmitted on an IEEE1394 network, commands for controlling digital VCRs by using disk storages, and the like are determined. These commands are transferred in the asynchronous transfer mode.

However, according to IEEE1394, even when packets are outputted in the order of the asynchronous transfer and the isochronous transfer, there is no guarantee that the packets are transmitted on the network in the order of the asynchronous transfer and the isochronous transfer. More specifically, even when packets are outputted in the order of the asynchronous transfer and the isochronous transfer to a packet transmitting apparatus according to IEEE1394, the packets are sometimes transmitted in the order of the isochronous transfer and the asynchronous transfer on the IEEE1394 network.

On the other hand, when reversely reproduced images are generated with MPEG pictures by using B pictures (bidirectionally predictive coded pictures) or P pictures (inter-frame forward predictive coded pictures), display of the decoded images should be switched for each picture.

FIG. 3 illustrates a structure of an MPEG decoder using B pictures and P pictures. An MPEG image input 3a to be decoded is inputted to an MPEG decoder 31 which performs decoding that is compliant with syntaxes according to MPEG. A reference picture memory 32 is a memory that stores reference pictures which are necessary to decode MPEG images. In this case, reference pictures at the decoding of MPEG images are stored in the reference picture memory 32. The MPEG images decoded by the MPEG decoder 31 are stored in a frame memory 33, and the images in the frame memory 33 are displayed on a monitor 34.

A method of reverse playback using P and B pictures will be described. FIGS. 4(a) to 4(c) show a method of forward playback using P and B pictures. At the forward playback, when images are to be displayed in the order of B0, B1, I1, B2, P3, B4, I5, B6, and P7, pictures are inputted to the MPEG decoder 31 in the order of I1, B0, P3, B2, I5, B4, P7, and B6. Then, the MPEG decoder 31 stores reference pictures which are necessary to decode B pictures, in the reference picture memory 32 according to the order shown in FIG. 4(c). Here, the pictures denoted by "I" are I pictures, which can be decoded without requiring other reference pictures to obtain video. The pictures denoted by "P" are P pictures, which require the forward prediction with referring to an immediately preceding I or P picture to be decoded. The pictures denoted by "B" are B pictures, which, otherwise specified, require the forward prediction with referring to an immediately preceding I or P picture and the backward prediction with referring to an immediately subsequent I or P picture, to be decoded.

The pictures decoded by the MPEG decoder 31 are stored in the frame memory 33 in the order of B0, I1, B2, P3, B4, I5, B6, and P7, and displayed on the monitor 34 in the same order. At this time, a switch 36 is always in a state for passing the pictures.

FIGS. 5(a) to 5(e) shows the method of reverse playback using P and B pictures. The description is given of the method for reversely reproducing the pictures shown in FIG. 4 in the order of B4, P3, B2, and I1. In order to decode B4 picture, reference pictures P3 and I5 are required. However, to generate the reference picture P3, a further preceding I1 picture is required. That is, four pictures I1, P3, I5, and B4 are required to decode the picture B4. Similarly, pictures I1 and P3 are required to decode picture P3, and pictures I1, P3 and B2 are required to decode picture B2. I1 picture does not require other pictures to be decoded.

When the picture B4 is to be decoded now, the pictures I1, P3 and I5 should be decoded, in addition to the picture B4. The decoded pictures I1, P3, and I5 are stored in the reference picture memory 32, but it is unfavorable that these pictures are stored in the frame memory 33. Thus, the switch 36 is controlled by a display control unit 35 shown in FIG. 3 for outputting only the picture B4 to the frame memory 33 to be displayed. At this time, the display control unit 35 should generate commands 5B for instructing to perform decoding in the MPEG decoder 31 but not to display an obtained picture, and commands 5A for instructing to perform decoding in the MPEG decoder 31 and also performing image display, as shown in FIG. 5(d), thereby controlling the switch 36 so as to control the storage of pictures into the frame memory 33. The same processing is performed also for other pictures. Here, in the case of playback other than the reverse playback, which does not use B and P pictures, generated commands are all 5B.

As described above, when MPEG images are to be reversely reproduced, the function of performing control so as to decode pictures but not to display decoded images is added in units of pictures, thereby to generate images reversely reproduced using P and B pictures.

FIG. 2 illustrates a prior art image transmitting apparatus. In this figure, reference numeral 21 denotes a transmission apparatus. Numeral 22 denotes a storage device, which is a hard disk in this example, in which MPEG transport streams are recorded in an arbitrary format. Numeral 23 denotes an IEEE1394 transmission/receiving means, and numeral 24 denotes a storage device control means.

Numeral 25 denotes a reproduction apparatus, which comprises an IEEE transmission/receiving means 26, a command generation means 27, and an image reproduction means 28. In this figure, MPEG images are recorded in the storage device 22 in the form of MPEG transport streams. The command generation means 27 in the reproduction apparatus 25 generates a reproduction command 2a for reproducing images from an MPEG transport stream which is stored in the storage device 22, and transmits the generated command 2a to the IEEE1394 transmission/receiving means 26. The reproduction command 2a is compliant with a command of IEEE1394 T.A. (Trade Association), which indicates a state of the playback, such as playback, fast forward, reverse playback, stop of playback, and the like, but does not control reproduction of each picture.

The IEEE1394 transmission/receiving means 26 converts the reproduction command 2a into an asynchronous packet on the IEEE1394, and transmits the packet via the IEEE1394 network 2b to the IEEE1394 transmission/receiving means 23. The IEEE1394 transmission/receiving means 23 extracts the reproduction command 2a from the transmitted asynchronous packet, and transmits the extracted command 2a to the storage device control means 24. The storage device control means 24 reads an MPEG transport stream which is recorded in the storage device 22, corresponding to the reproduction command 2a, and transmits the readout MPEG transport stream 6a to the IEEE1394 transmission/receiving means 23.

The IEEE1394 transmission/receiving means 23 converts the MPEG transport stream 6a that is read out from the storage device 22 into an isochronous packet, and transmits the packet through the IEEE1394 network 2b. The transmitted isochronous packet is converted into an MPEG transport stream by the IEEE1394 transmission/receiving means 26, and transmitted to the image reproduction means 28. The components as shown in FIG. 3 other than the display control unit 35 are included in the image reproduction means 28. Since a decoding control signal 3b outputted from the display control unit 35 in FIG. 3 is generated in synchronized with a picture which is read out of the storage device 22, this signal is stored in the storage device control means 24.

FIG. 6 illustrates a structure of the IEEE1394 transmission/receiving means 23 and 26. The reproduction command 2a is converted into an asynchronous transfer packet by an asynchronous transfer means 61, and transmitted/received via the IEEE1394 network 2b through an IEEE1394 link layer 63 and an IEEE1394 physical layer 64. An MPEG transport stream 6a is converted into an IEEE1394 isochronous packet by an isochronous transfer means 62, and transmitted/received via the IEEE1394 network 2b through the IEEE1394 link layer 63 and the IEEE1394 physical layer 64. The method for converting the MPEG transport stream and the method for transmitting/receiving the packets by means of the IEEE1394 transmission/receiving means are determined in IEEE1394. The IEEE1394 link layer 63 and the IEEE1394 physical layer 64 are standardized by IEEE1394.

FIG. 7 shows a structure of an MPEG transport stream. In FIG. 7, reference numeral 72 denotes a bit stream that is called an elementary stream in which information such as video or audio is described. As images, MPEG video compressed bit streams are contained in many cases. This bit stream syntax is pursuant to a format that is defined by ISO/IEC 13818-2. The elementary stream 72 sometimes contains Sequence_header, in which information about the method for compressing images, identification of Standard Definition images and High Definition images, structures of pictures, and output intervals between pictures are described. A stream which comprises the elementary stream 72 and a PES header 71 that is defined by ISO/IEC 13818-1 is called a PES stream 70.

The PES stream 70 is divided into an arbitrary size, then w a header defined by ISO/IEC 13818-1 is added to obtain a fixed packet of 188-byte length, and various information is further added thereto to obtain multiple channels, resulting in an MPEG transport stream.

Here, it is assumed that an MPEG image refers to an MPEG transport stream defined by ISO/IEC 13818-1, which has elementary streams that are defined by ISO/IEC 13818-2 or ISO/IEC 11172-2 as pictures.

When the images stored in the storage device are subjected to forward reproduction, stop of reproduction, and reverse reproduction of only I pictures in the conventional structure as shown in FIG. 2, the reproduction command 2a is transmitted or received in the asynchronous transfer mode and then the isochronous transfer is resumed, as shown in FIGS. 2, 3, and 4. Even when the isochronous transfer is performed after it is confirmed that the transmission or receiving according to the asynchronous transfer is completed, images can be reproduced without problems.

On the other hand, when the reverse playback using P and B pictures is performed, a decoding control signal should be generated for each picture. As this decoding control signal depends on a structure of a GOP (Group Of Picture), this signal is contained in the storage device control means 24 in FIG. 2. Accordingly, the decoding control signal 3b that is generated by the display control unit 35 in the storage device control means 24 must be transmitted to the image reproduction means 28 in the reproduction apparatus 25 via the IEEE1394 network 2b. Since the decoding control signal 3b generated by the display control unit 35 is synchronized with an image which is read out from the storage device 22 and further this is a command signal, this signal should be transmitted in the asynchronous transfer mode through the IEEE1394 network 2b.

To be more specific, an MPEG picture that is transferred in the isochronous transfer mode and the decoding control signal 3b generated by the display control unit 35, which is transmitted in the asynchronous transfer mode, should be transmitted in synchronized with each other on the IEEE1394 network 2b.

When an MPEG picture that is transferred according to the isochronous transfer is transmitted to the isochronous transfer means 62 after an asynchronous packet of the decoding control signal 3b generated by the display control unit 35 is inputted to the asynchronous transfer means 61 in the IEEE1394 transmission/receiving means 23, there are some cases where the IEEE1394 link layer 63 does not perform the asynchronous transfer of a previously inputted packet but performs the isochronous transfer of a later inputted picture. This is because the transmission order of the asynchronous transfer and the isochronous transfer is not ensured in the IEEE1394 standards.

Even if the transfer is performed in the order of asynchronous transfer and isochronous transfer, there may be the possibility that the transmission order is inverted after the receiving. After the completion of asynchronous transfer is checked, i.e., when the asynchronous transfer is performed while stopping the isochronous transfer in the meantime and thereafter MPEG pictures are transmitted by the isochronous transfer means 62, the transfer rate may be adversely rate-determined to the asynchronous transfer rate, and The band for the isochronous transfer may not be ensured, because the transmission band of the asynchronous transfer is not ensured. The commands for reproduction or stop do not require to consider the transmission bands before and after the commands, but the control signal for each picture should ensure also the transmission bands before and after the command.

That is, in the conventional structure, the decoding control signal 3*b* that is synchronized with a picture cannot be transmitted or received to perform reverse reproduction of MPEG images.

The conventional reversely reproduced image generation apparatus has the aforementioned structure and, accordingly, when an apparatus for generating a reversely reproduced image via an IEEE1394 network is connected with an apparatus for decoding the reversely reproduced image, an MPEG picture that is transferred in the isochronous transfer mode is not synchronized with a control signal that is transferred in the asynchronous transfer mode, because the transfer order of the asynchronous transfer and the isochronous transfer is not ensured, whereby the reversely reproduced image cannot be decoded.

SUMMARY OF THE INVENTION

The present invention has for its object to provide a reproduced image transmitting apparatus which ensures a synchronization between an MPEG picture that is received on a reproduction apparatus side and a control signal for the MPEG picture, and enables the reverse reproduction according to MPEG using P and B pictures.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a reproduced image transmitting apparatus which transmits reproduced images through a bidirectional network that is constituted by an IEEE1394 interface having two transfer modes, i.e., an isochronous transfer mode in which a band is ensured, and an asynchronous transfer mode in which images are transferred asynchronously, comprising: a data storage means for storing reproduced image data; and a data processing means for processing the reproduced image data which are read from the data storage means so as to transmit the reproduced image data and a reproduction control parameter for controlling reproduction of the reproduced image data, in the isochronous transfer mode. Therefore, the synchronization between the control signal for each picture and the reproduced image data to be transferred is surely obtained, whereby reversely reproduced images can be obtained under the control of decoding in units of pictures.

According to a 2nd aspect of the present invention, in the reproduction image transmitting apparatus of the 1st aspect, the reproduced image data is an MPEG transport stream, and the reproduction control parameter is associated with an instruction as to decoding and display processes for the MPEG transport stream. Therefore, reversely reproduced images corresponding to an MPEG transport stream can be obtained under the control of decoding in units of pictures.

According to a 3rd aspect of the present invention, in the reproduction image transmitting apparatus of the 2nd aspect, the data processing means allocates the reproduction control parameter instructing to perform decoding and to perform display, to perform decoding but not to perform display, not to perform decoding and to keep displaying a previous picture, or not to perform decoding and not to display any picture, to an area from flags 3'*b*101 to 3'*b*111 of trick_mode_control and following 5 bits begin in DSM (Digital storage Media) in PES_header that is defined by ISO/IEC 13818-1. Therefore, the reproduction control parameter associated with control of decoding, reproduction, and display of images on the reproduction end can be transmitted by employing a format defined by MPEG.

According to a 4th aspect of the present invention, in the reproduction image transmitting apparatus of the 3rd aspect, the data processing means allocates a reproduction control parameter instructing to perform decoding and to perform display, to trick_mode_control=3'*b*100 and rep_cntrl 5'*b*00000 in the DSM in PES_header defined by ISO/IEC 13818-1, and a reproduction control parameter instructing to perform decoding but not to perform display, to trick_mode_control=3'*b*100 and rep_cntrl 5'*b*00000 in the DSM of PES_header. Therefore, the reproduction control parameter associated with control of decoding, reproduction, and display of pictures on the reproduction end can be transmitted by employing a format defined by MPEG.

According to a 5th aspect of the present invention, in the reproduction image transmitting apparatus of the 2nd aspect, the data processing means describes a control signal instructing to perform decoding and to perform display, to perform decoding but not to perform display, not to perform decoding and to keep displaying a previous picture, or not to perform decoding and not to display any picture, in PES_private_data or PES_extension_field_length in PES_header defined by ISO/IEC 13818-1. Therefore, the reproduction control parameter associated with control of decoding, reproduction, and display of pictures on the reproduction end can be transmitted by utilizing a format defined by MPEG. Further, the control of decoding, reproduction, and display of the respective pictures can be controlled even when one PES comprises plural pictures.

According to a 6th aspect of the present invention, the reproduction image transmitting apparatus of the 2nd aspect comprises: a code amount monitoring means for monitoring an amount of readout codes corresponding to the reproduced image data which are read out from the data storage means and, when the code amount becomes smaller than a predetermined value, generating an underflow occurrence signal that indicates that an amount of data stored in a buffer of a decoder in a reproduction apparatus is smaller than an amount that is required for a decoding process; a dummy data generation means for receiving the underflow occurrence signal generated by the code amount monitoring means, and generating dummy packets; and a selector means for embedding the dummy packets in the MPEG transport stream that has been processed by the data processing means. Therefore, the buffer underflow on the reproduction end can be avoided, whereby problems that a decoding process is failed and images on the screen freeze or the like can be prevented.

According to a 7th aspect of the present invention, there is provided a reproduced image transmitting apparatus which transmits reproduced images through a bidirectional network that is constituted by an IEEE1394 interface having two transfer modes, i.e., an isochronous transfer mode in which a band is ensured, and an asynchronous transfer mode in which images are transferred asynchronously, in which a data storage means is included for storing the reproduced image data and a reproduction control parameter which is required to obtain the reproduced image data by the reverse reproduction, and the reproduced image data and the reproduction control parameter are transmitted in the isochronous transfer mode. Therefore, when the reverse reproduction command is transmitted from the receiving end, reversely reproduced images can be easily obtained on the receiving end only by transmitting predetermined image data which are read out from the data storage means that contains reversely reproduced images, to the receiving end through the IEEE1394 network.

According to an 8th aspect of the present invention, in the reproduction image transmitting apparatus of the 2nd aspect, the data processing means describes a reproduction control parameter instructing to perform decoding and to perform display, to perform decoding but not to perform display, not to perform decoding and to keep displaying a previous picture, or not to perform decoding and not to display any picture, in Temporal_Reference in Picture_header defined by ISO/IEC 13818-2. Therefore, in cases where one PES comprises plural pictures, or the position of a picture and the header position of the PES are asynchronous with each other, the reverse reproduction can be performed normally.

BRIEF DESCRIPTION OF THE DRAWINGS

FIG. 10 is a diagram for explaining descriptions of trick_mode_control and DSM_data which are rewritten.

FIG. 16 is a diagram showing an example of command setting by an MPEG transport stream processing means which constitutes a reproduced image transmitting apparatus according to a third embodiment of the present invention.

DETAILED DESCRIPTION OF THE PREFERRED EMBODIMENTS

Embodiment 1

Figure 1:
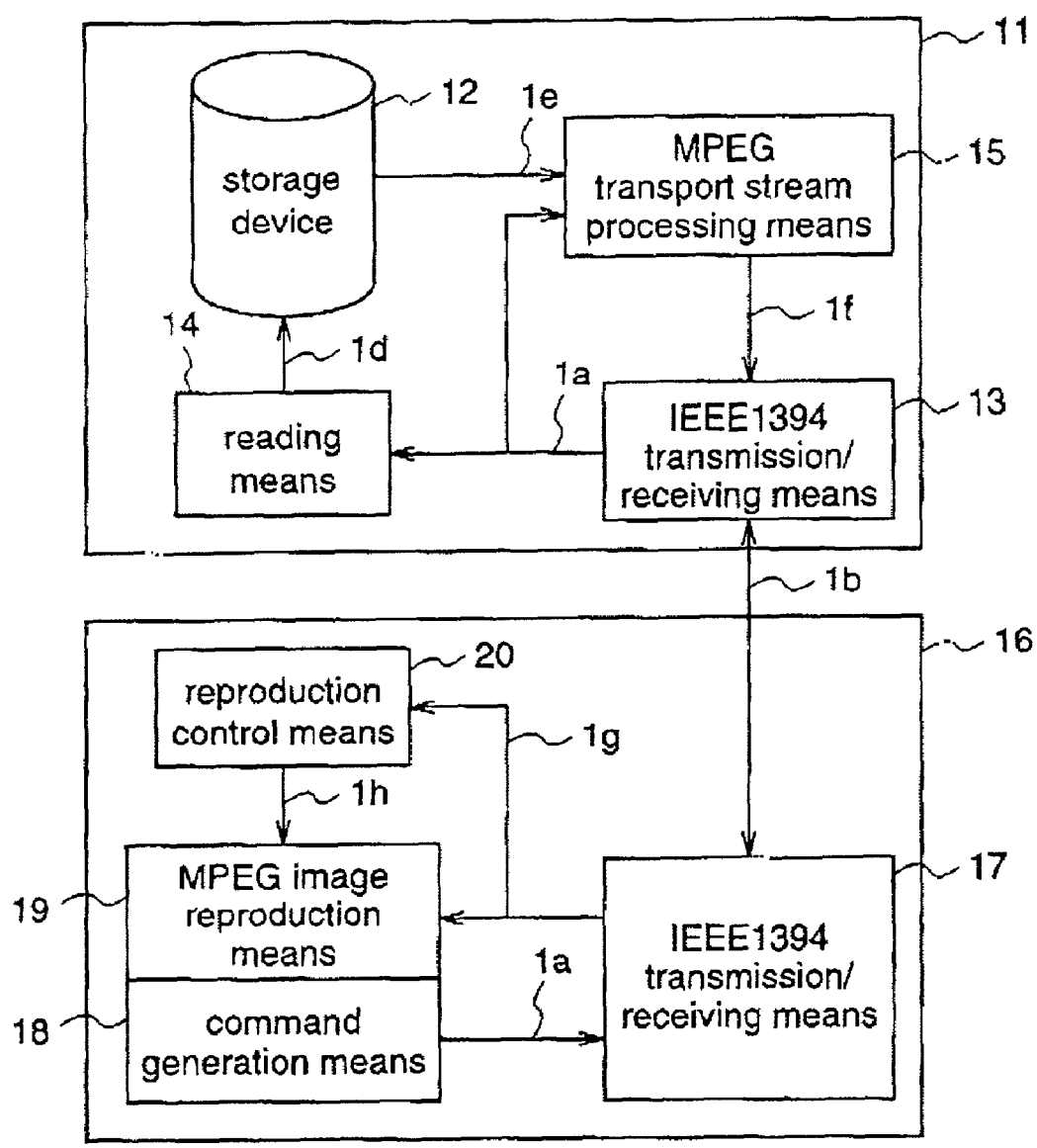
FIG. 1 is a block diagram illustrating a structure of a reproduced image transmitting apparatus according to a first embodiment of the present invention.

FIG. 1 is a block diagram illustrating a structure of an image transmitting apparatus as a reversely reproduced image generating apparatus according to a first embodiment of the present invention. In this figure, reference numeral 11 denotes a transmission apparatus, which comprises a storage device 12 for storing data, an IEEE1394 transmission/receiving means 13 as a data transmitting/receiving means, a reading means 14 for reading predetermined data from the storage device 12, and an MPEG transport stream processing means 15 for processing an MPEG transport stream that is stored in the storage device 12.

Numeral 16 denotes a reproduction apparatus, which comprises an IEEE1394 transmission/receiving means 17 as a data transmitting/receiving means, a command generation means 18 for generating a command that is pursuant to IEEE1394 T.A. (Trade Association), an MPEG image reproduction means 19 for reproducing images from an inputted MPEG transport stream 1g to be displayed, and a reproduction control means 20 for controlling the MPEG image reproduction means 19.

The transmission apparatus 11 and the reproduction apparatus 16 are connected via an IEEE1394 network 1b. The storage device 12 is a device being capable of random access, such as a hard disk, in which MPEG transport streams are recorded in arbitrary formats. These MPEG images are images defined by ISO/IEC 13818-2 or ISO/IEC 11172-2. The MPEG transport stream is a stream including the MPEG images as an elementary stream, which is defined by ISO/IEC 13818-1.

Figure 2:
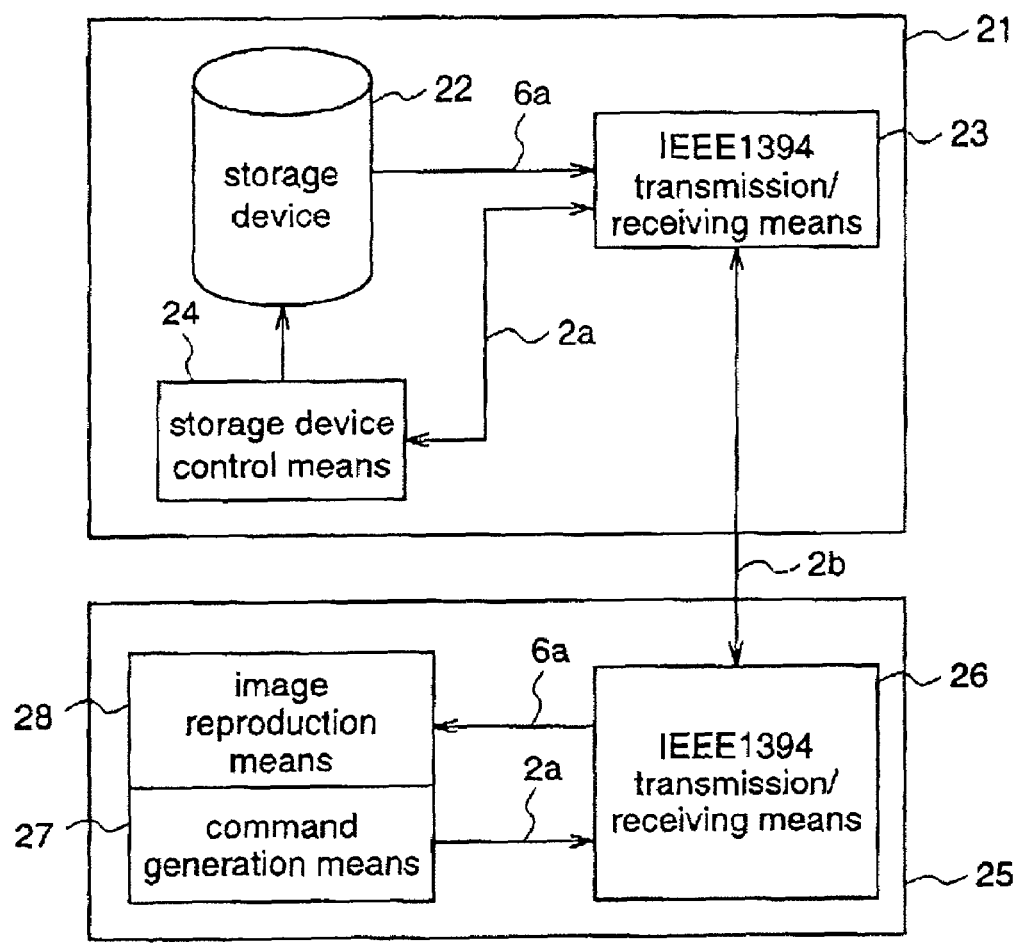
FIG. 2 is a block diagram illustrating a structure of a prior art image reproduction apparatus.

Hereinafter, an operation will be described with reference to FIG. 1. Like the prior art as shown in FIG. 2, the command generation means 18 transmits a reproduction command 1a that is pursuant to IEEE1394 T.A. (Trade Association) to the IEEE1394 transmission/receiving means 17. The IEEE1394 transmission/receiving means 17 is connected with the IEEE1394 network 1b, and converts the reproduction command 1a into an asynchronous packet of a format defined by IEEE1394 T.A (Trade Association), thereby to transmit the asynchronous packet to the IEEE1394 transmission/receiving means 13 in the transmitting apparatus 11, through the IEEE1394 network 1b.

Figure 6:
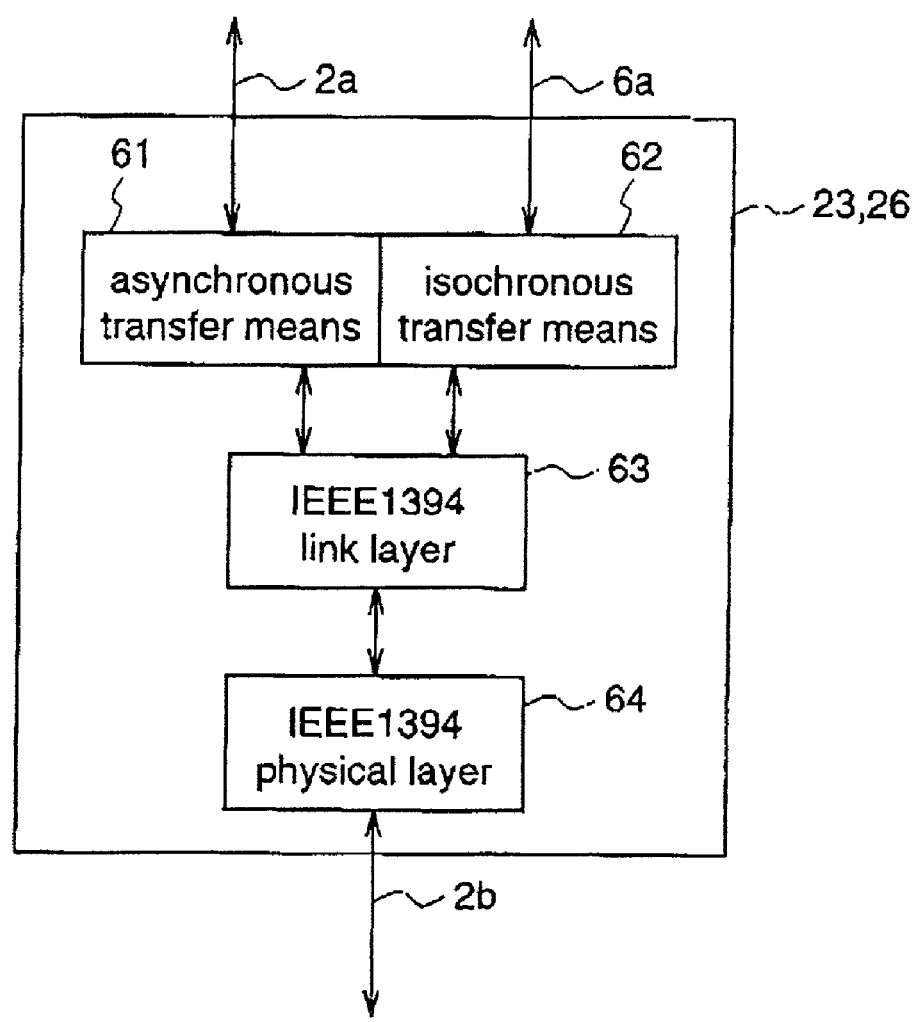
FIG. 6 is a diagram illustrating a structure of an IEEE1394 transmission/receiving means.
Figure 7:
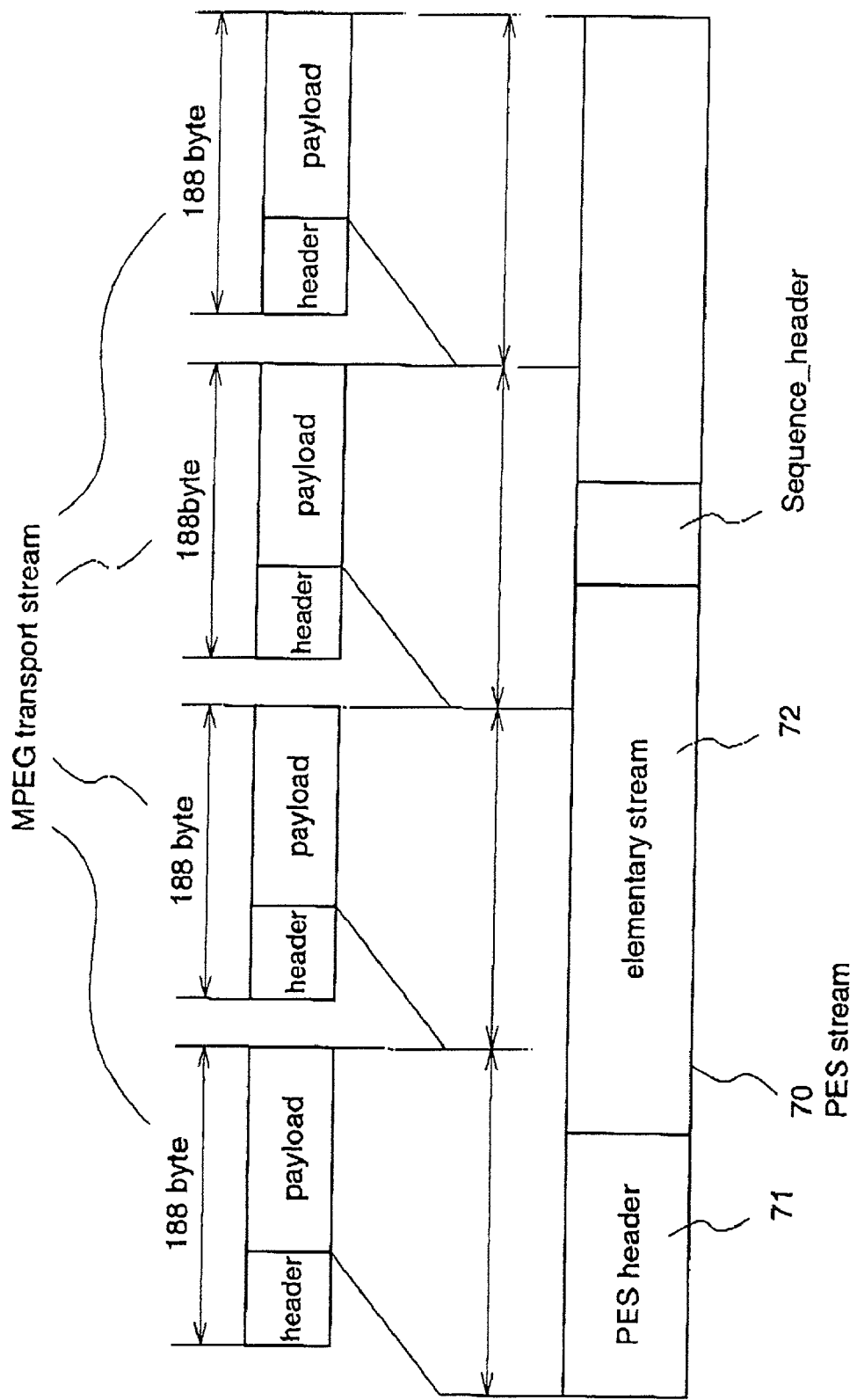
FIG. 7 is a diagram for explaining a structure of an MPEG transport stream.

The structure of the IEEE1394 transmission/receiving means 13 and 17 is the same as shown in FIG. 6.

The IEEE1394 transmission/receiving means 13 extracts the reproduction command 1a from the received asynchronous packet, and transmits the extracted command 1a to the reading means 14.

Figure 4:
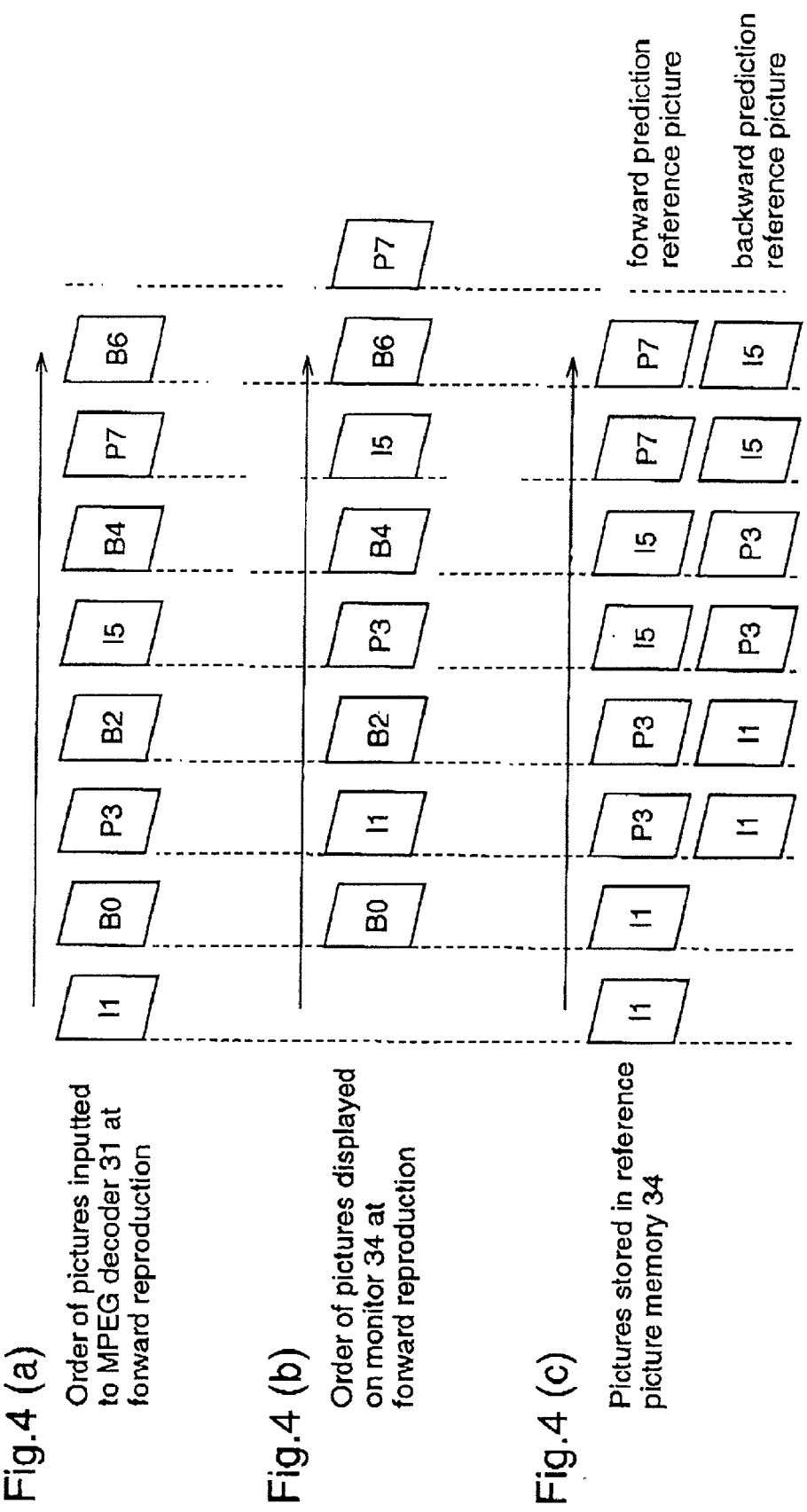
FIGS. 4(a) to 4(c) are diagrams for explaining a method of forward play using P and B pictures.
Figure 5:
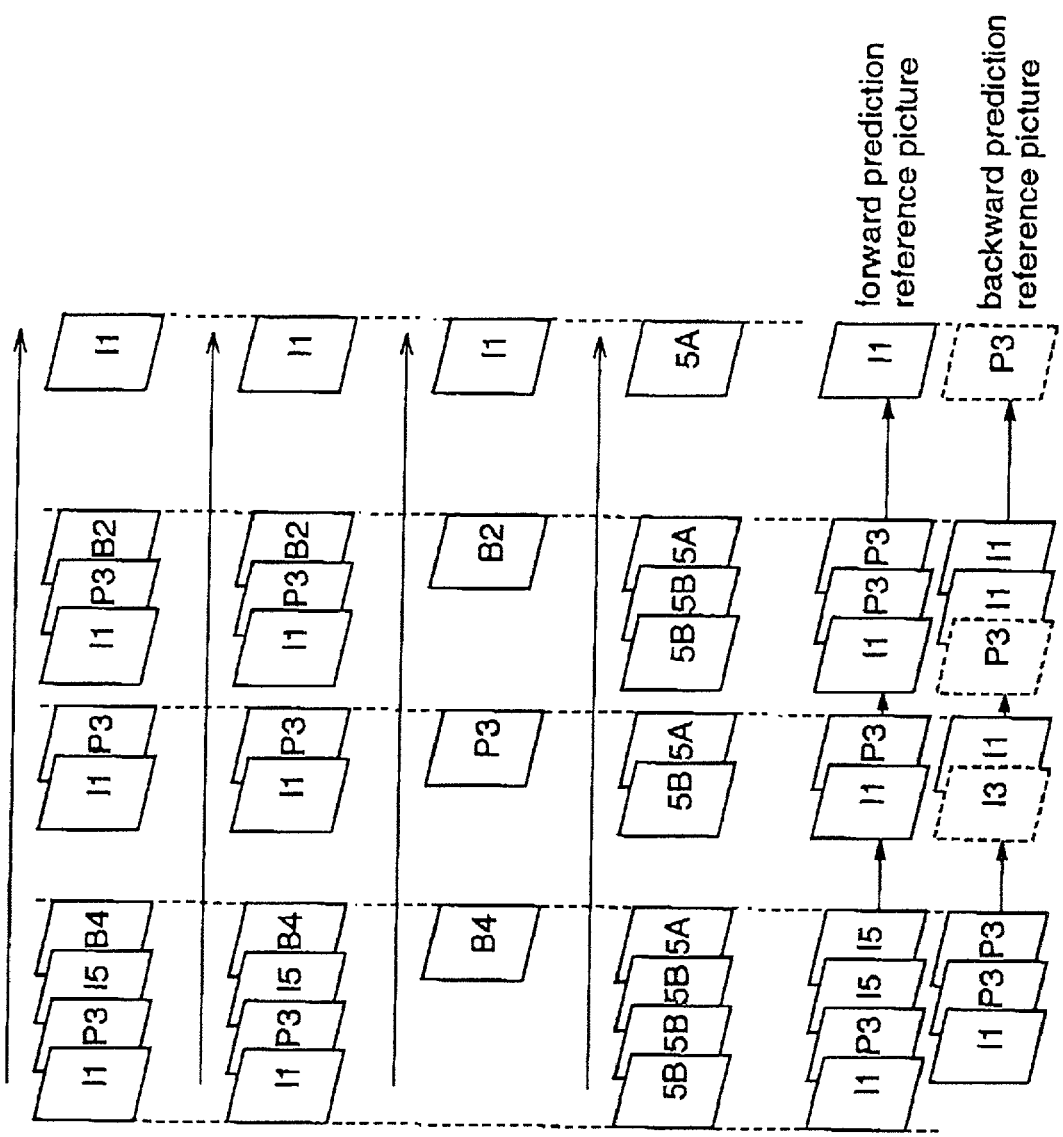
FIGS. 5(a) to 5(e) are diagrams for explaining a method of reverse play using P and B pictures.

The reading means 14 selects pictures in accordance with the reproduction command 1a from the MPEG transport streams which are stored in the storage device 12, and transmits the selected pictures to the MPEG transport stream processing means 15 as an MPEG transport stream 1e. For example, in the case of forward playback, the reading means 14 selects pictures in the order of I1, B0, P3, B2, . . . , as in the order of pictures inputted to the MPEG decoder 31 as shown in FIG. 4(a). Similarly, in the case of reverse playback using P and B pictures, the reading means 14 selects four pictures in the order of I1, P3, I5, and B4 to display picture B4, and outputs the selected pictures according to the order of pictures inputted to the MPEG decoder 31, as shown in FIG. 5.

When the MPEG transport stream 1e transmitted to the MPEG transport stream processing means 15 is outputted as it is at the reverse playback using P and B pictures, an image that is different from a target image is adversely displayed.

Thus, the MPEG transport stream processing means 15 adds a signal for controlling the reproduction control means 20, to the MPEG transport stream. An MPEG transport stream 1f to which the signal for controlling the reproduction control means 20 has been added is transmitted to the IEEE1394 transmission/receiving means 13.

Figure 8:
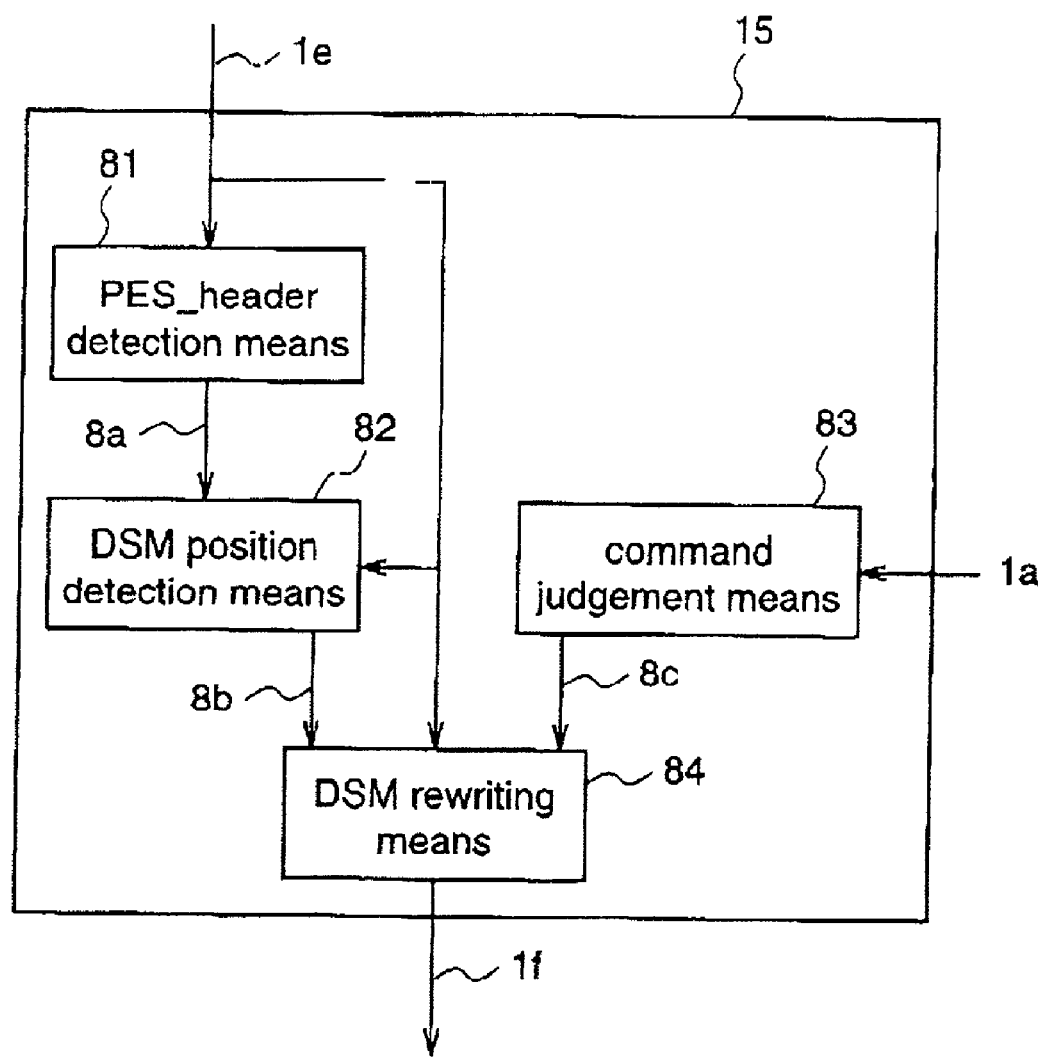
FIG. 8 is a block diagram illustrating a structure of an MPEG transport stream processing means.

FIG. 8 illustrates a structure of the MPEG transport stream processing means 15, which comprises a PES (Packetized Elementary Stream)_header detection means 81, a DSM (Digital Storage Media) position detection means 82, a command judgement means 83, and a DSM rewriting means 84.

The readout MPEG transport stream 1e is inputted to the PEG_header detection means 81, the DSM position detection means 82, and the DSM rewriting means 84, respectively. The PES_header detection means 81 detects PES_header from the inputted MPEG transport stream 1e, and transmits a PES_header recognition signal 8a to the DSM position detection means 82.

Figure 9:
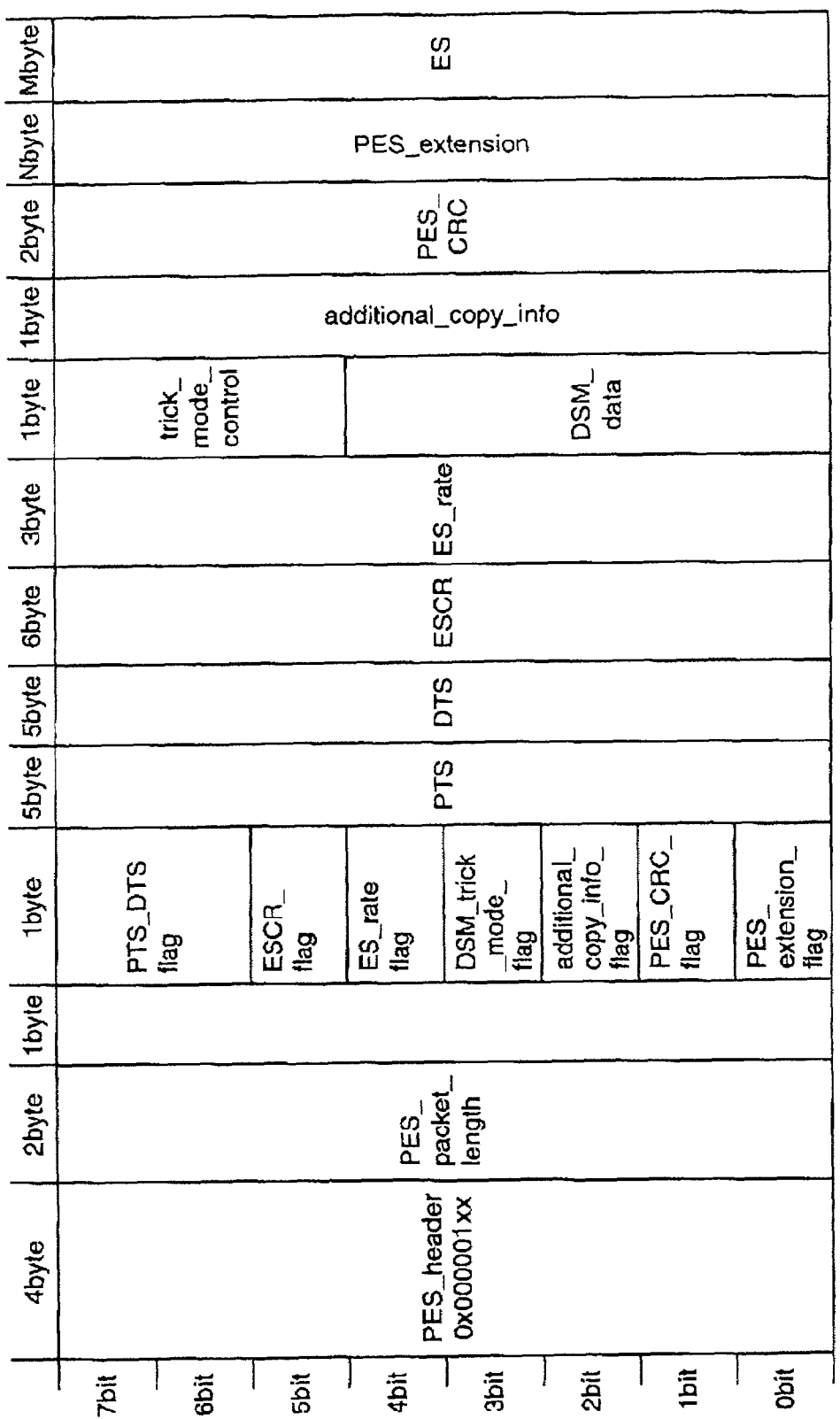
FIG. 9 is a diagram for explaining a structure of a PES that is defined by MPEG.

FIG. 9 illustrates a structure of a PES. The structure of a PES as shown in FIG. 9 is defined by ISO/IEC 13818-1. In this first embodiment, it is assumed that one PES comprises one MPEG picture. In FIG. 8, when the DSM position detection means 82 receives the PES_header recognition signal 8a, and when DSM_trick_mode_flag is on, the detection means 82 transmits positions of trick_mode_control and DSM_data, as well as PES_CRC_flag of the next PES to the DSM rewriting means 84 as a DSM recognition signal 8b. On the other hand, when DSM_trick_mode_flag is off, the DSM position detection means 82 transmits PES_packet_length, DSM_trick_mode_flag, and PES_header_data_length, as well as PES_CRC flag of the next PES to the DSM rewriting means 84 as the DSM recognition signal 8b. The command judgement means 83 judges the inputted reproduction command 1a and, in the case of reverse reproduction, transmits a reverse reproduction signal 8c to the DSM rewriting means 84.

When DSM_trick_mode_flag is on, the DSM rewriting means 84 rewrites trick_mode_control and DSM_data of the inputted MPEG transport stream 1e. The DSM rewriting means 84 further calculates CRC of the PES after the rewriting. When PES_CRC_flag is on in the next PES, the DSM rewriting means 84 rewrites PES_CRC and transmits the MPEG transport stream If to the IEEE1394 transmission/receiving means 13.

When the DSM_trick_mode_flag is off, the DSM rewriting means 84 rewrites PES_packet_length as zero or adds 1 to PES_packet_length, sets DSM_trick_mode_flag, adds 1 to PES_header_data_length, and inserts the obtained data in the positions of trick_mode_control and DSM_data. The DSM rewriting means 84 further calculates CRC of the PES after the rewriting. When PES_CRC_flag is on in the next PES, the DSM rewriting means 84 rewrites PES_CRC, and transmits an obtained MPEG transport stream 1f to the IEEE1394 transmission/receiving means 13.

Practical examples of trick_mode_control and DSM_data, which are rewritten by the DSM rewriting means 84 are shown in FIG. 10. In FIG. 10, command A provides a description that instructs to decode an MPEG image and display a decoded picture, and this is the same as the command 5A in FIG. 5. Command B provides a description that instructs to decode an MPEG image and not to display the decoded picture but keep displaying a decoded picture that was previously displayed as it is, and this is the same as the command 5B in FIG. 5. Command C provides a description that instructs not to decode an inputted MPEG image and clear a previously displayed decoded picture. Command D provides a description that instructs not to decode an inputted MPEG image but to keep displaying a previously displayed decoded picture as it is.

The MPEG transport stream processing means 15 adds the commands that are generated by the display control unit 35 as shown in FIG. 5(d), to PES_header. The MPEG transport stream processing means 15 performs processing so that the command 5B in FIG. 5(d) corresponds to the command B in FIG. 10 and the command 5A in FIG. 5(d) corresponds to the command A in FIG. 10. In FIG. 1, the MPEG transport stream if that has been transmitted to the IEEE1394 transmission/receiving means 13 is converted into an isochronous packet by the IEEE1394 transmission/receiving means 13, and transmitted through the IEEE1394 network 1b.

The isochronous packet is transmitted to the reproduction apparatus 16 through the IEEE1394 network 1b, converted into an MPEG transport stream 1g in the IEEE1394 transmission/receiving means 17, and transmitted to the MPEG image reproduction means 19 and the reproduction control means 20. The reproduction control means 20 extracts the command processed by the MPEG transport stream processing means 15 as shown in FIG. 10, from the MPEG transport stream 1g, and transmits the extracted command to the MPEG image reproduction means 19 as a picture control signal 1h.

Figure 11:
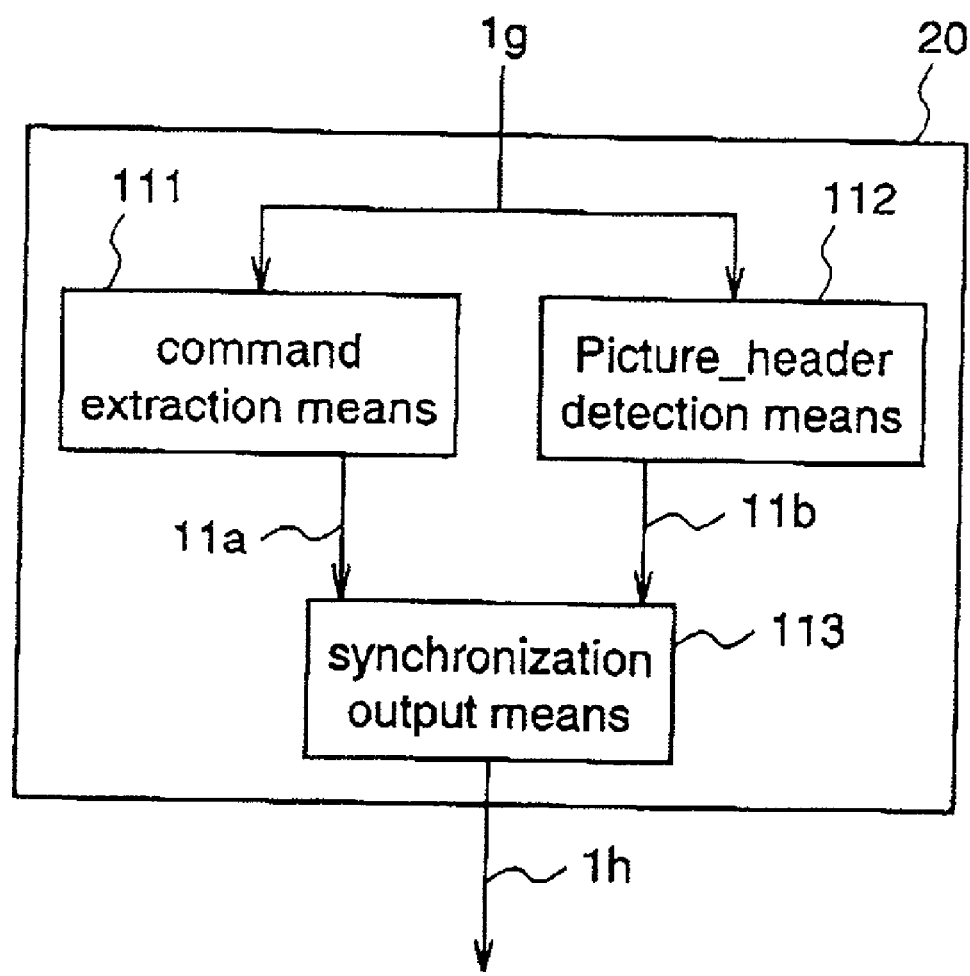
FIG. 11 is a diagram illustrating a structure of a reproduction control means which constitutes a reproduction means.

FIG. 11 shows a structure of the reproduction control means 20. In FIG. 11, the inputted MPEG transport stream 1g is transmitted to a command extraction means 111 and a Picture_header detection means 112. The command extraction means 111 extracts the command processed in the MPEG transport stream processing means 15 as shown in FIG. 10, from the MPEG transport stream 1g, and transmits a picture control signal 11a to a synchronization output means 113.

Figure 12:
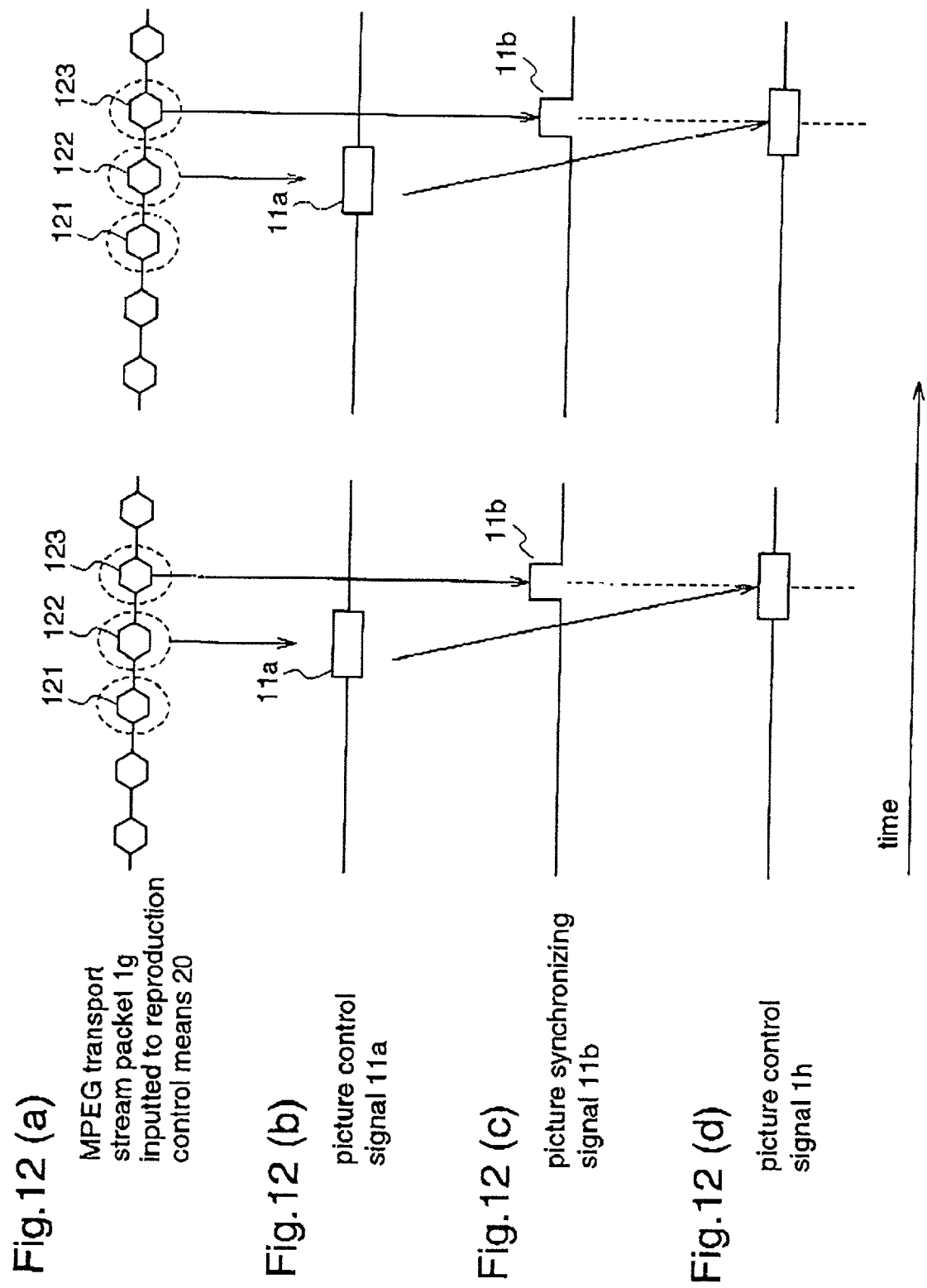
FIGS. 12(a) to 12(d) are diagrams for explaining timings of generating a picture control signal.

The Picture_header detection means 112 extracts Picture_header from the MPEG transport stream 1g, and outputs a picture synchronizing signal 11b indicating that Picture_header has been detected, to the synchronization output means 113. The synchronization output means 113 outputs the picture control signal 11a in synchronized with the picture synchronizing signal 11b, as the picture control signal 1h. FIGS. 12(a) to 12(d) show the relationship between the MPEG transport stream 1g that is inputted to the reproduction control means 20, and the outputted picture control signal 1h. In FIG. 12, numeral 121 denotes an MPEG transport stream packet including PES_header in the inputted MPEG transport stream 1g. Numeral 122 denotes an MPEG transport stream packet including the picture control signal 11a in the inputted MPEG transport stream 1g. Numeral 123 denotes a packet including a Picture_header in the inputted MPEG transport stream 1g. The packets 121, 122 and 123 may be the same packet, but PES_header, the picture control signal, and Picture_header are inputted in this order.

The Picture_header detection means 112 detects a Picture_header from the packet 123, and generates the picture synchronizing signal 11b. The picture control signal 11a that is extracted from the packet 122 is transmitted in synchronized with the picture synchronizing signal 11b generated from the packet 123, as the picture control signal 1h.

Figure 3:
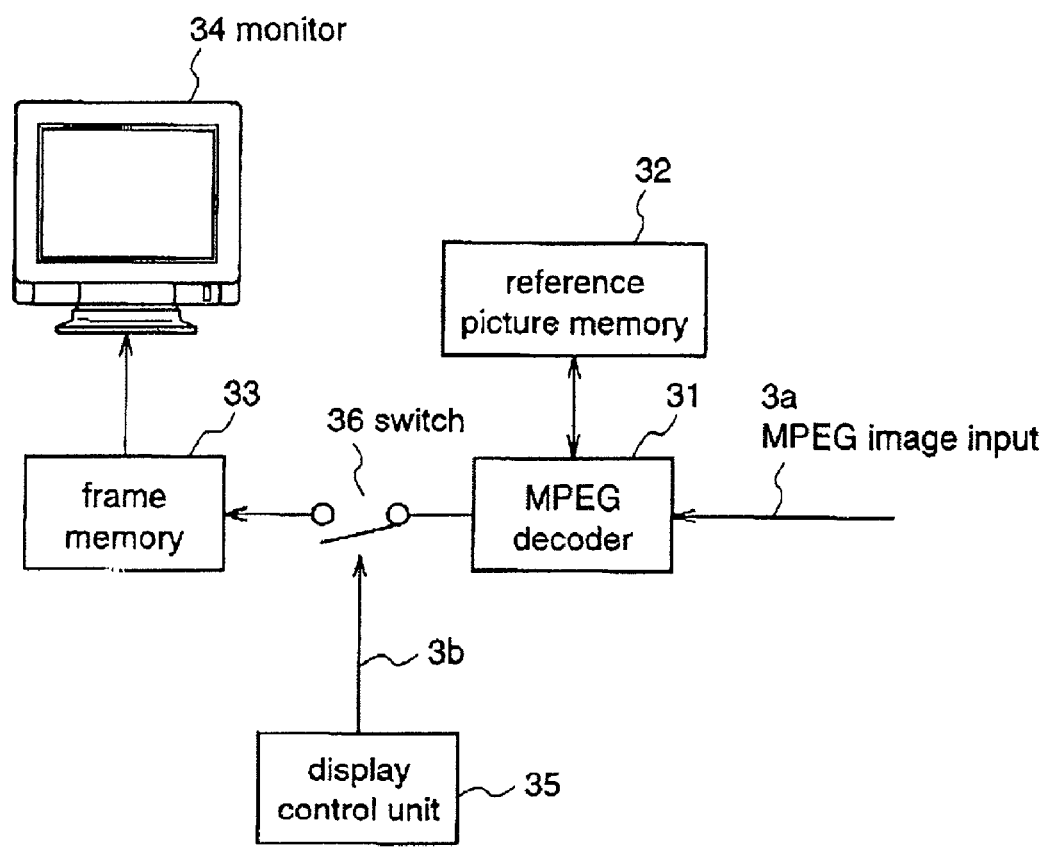
FIG. 3 is a diagram illustrating a structure of a prior art MPEG decoder.
Figure 13:
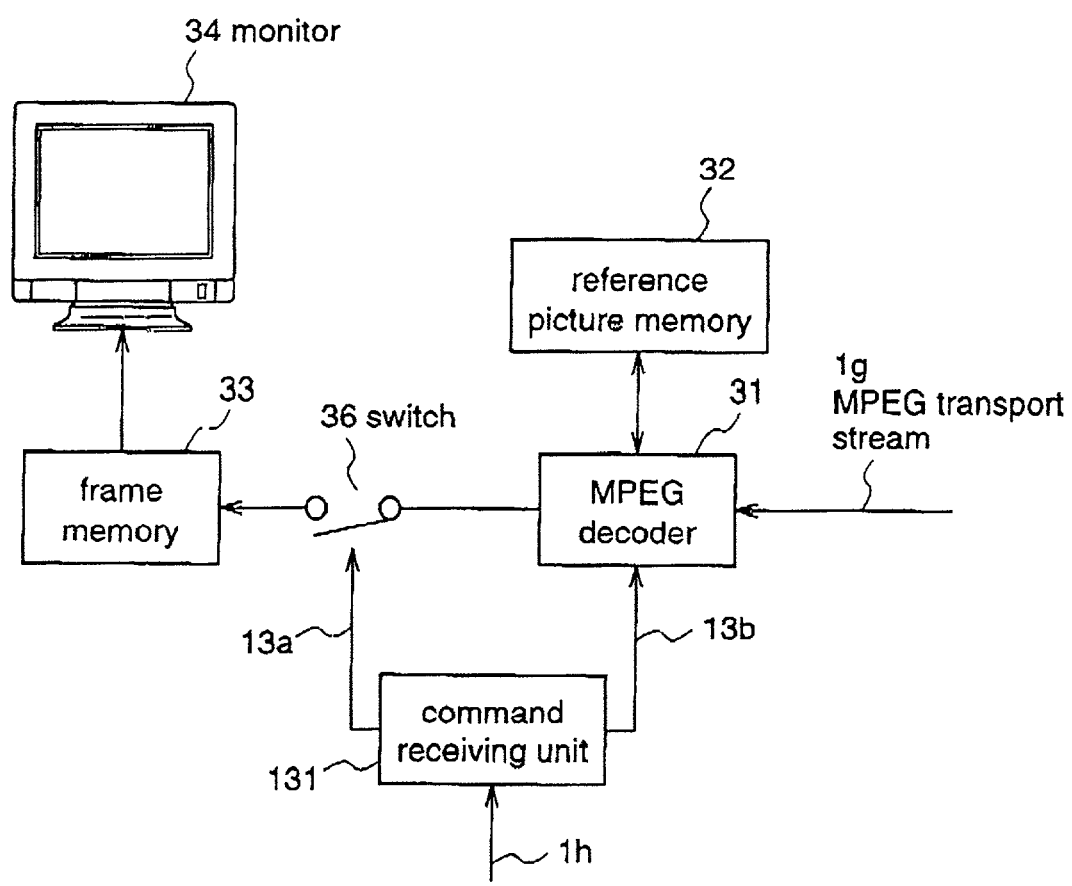
FIG. 13 is a diagram illustrating a structure of an MPEG image reproduction means which constitutes a receiver for receiving an MPEG transport stream that is transmitted from the reproduced image transmitting apparatus according to the first embodiment.

The MPEG image reproduction means 19 reproduces pictures from the inputted MPEG transport stream 1g to be displayed. The structure of the MPEG image reproduction means 19 is shown in FIG. 13. The elements other than a command receiving unit 131 and a decoding control signal 13b are the same as those in the prior art as shown in FIG. 3.

The command receiving unit 131 receives the picture control signal 1h. When the command A in FIG. 10 is inputted to the command receiving unit 131, the unit 131 transmits a display control signal 13a to the switch 36 for controlling to input an decoded picture to the frame memory 33, and a decoding control signal 13b to the MPEG decoder 31 for controlling to execute decoding. When the command B in FIG. 10 is inputted, the command receiving unit 131 transmits the display control signal 13a to the switch 36 for controlling not to input an decoded picture into the frame memory 33 but to keep the picture, and the decoding control signal 13b to the MPEG decoder 31 for controlling to execute decoding. When the command C in FIG. 10 is inputted, the unit 131 transmits the display control signal 13a to the switch 36 for controlling to input a decoded picture into the frame memory 33 or to clear an image in the frame memory 33, and the decoding control signal 13b to the MPEG decoder 31 for controlling not to execute decoding. When the command D as shown in FIG. 10 is inputted, the unit 131 transmits the display control signal 13a to the switch 36 for controlling to keep the picture in the frame memory 33, and the decoding control signal 13b to the MPEG decoder 31 for controlling not to execute decoding.

According to the first embodiment, when MPEG transport stream data which are transmitted from the transmitting apparatus 11 to the reproduction apparatus 16 and control signals for respective pictures are transmitted, the control signals for the respective pictures are embedded in unused parts in the DSM that is defined by MPEG, or by using the DSM efficiently, to be transmitted in the isochronous transfer mode. Therefore, in the image transmitting apparatus in the bidirectional network system employing the IEEE1394 interface, which does not ensure the transmission order of the isochronous transfer and the asynchronous transfer, the control for each picture and the synchronization of an MPEG transport stream to be transferred can be completely ensured, whereby the reverse reproduction of pictures can be performed under the control of decoding for each picture.

Embodiment 2

Figure 14:
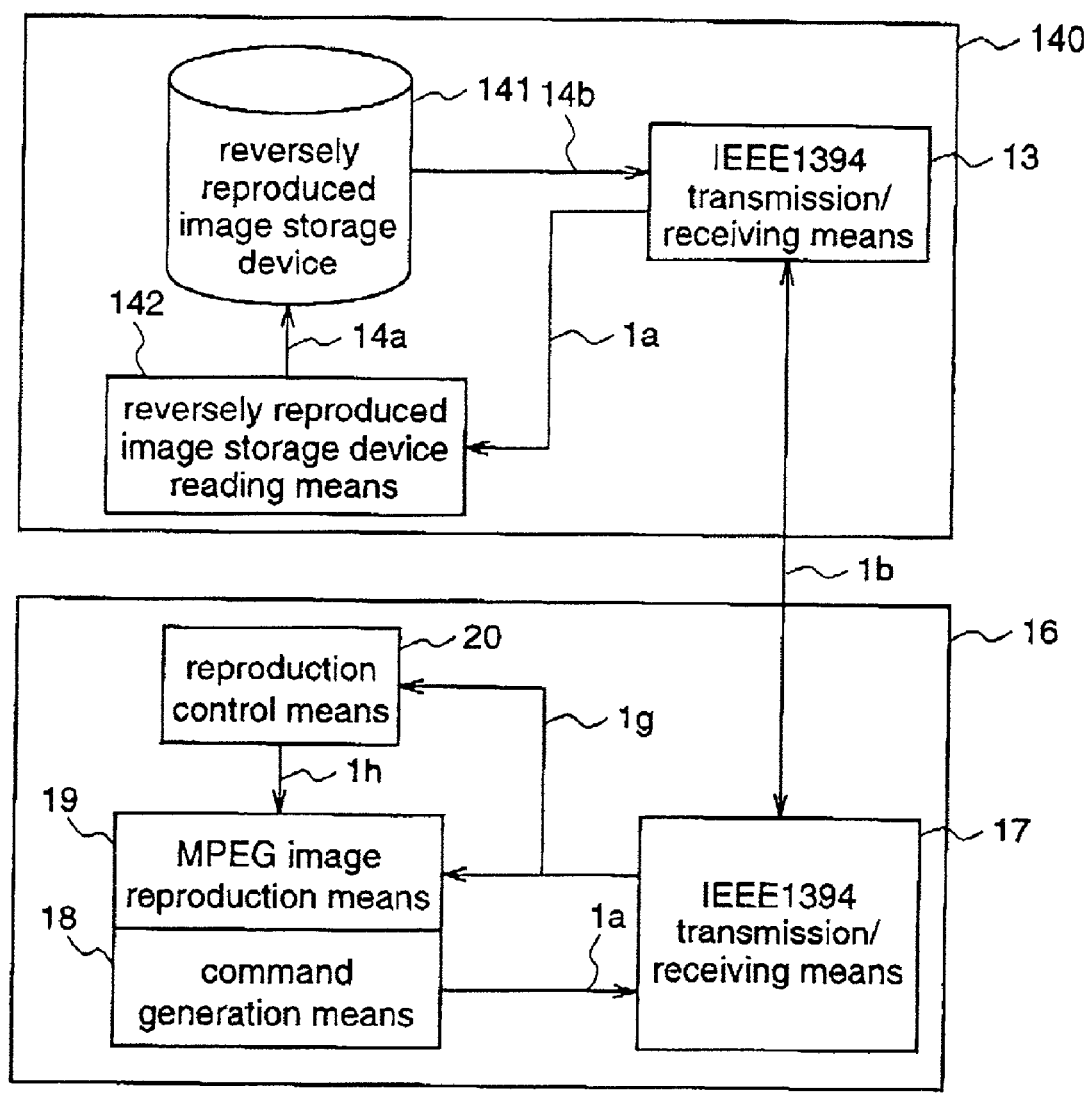
FIG. 14 is a block diagram illustrating a structure of a reproduced image transmitting apparatus according to a second embodiment of the present invention.

FIG. 14 shows an image transmitting apparatus according to a second embodiment of the present invention. The same reference numerals as those in the prior art structure as shown in FIG. 2 denote the same or corresponding components. A transmission apparatus 140 is provided with a reversely reproduced image storage device 141 in place of the storage device 22, and a reversely reproduced image storage device reading means 142 in place of the storage device control means 24. The reproduction apparatus 16 includes the reproduction control means 20, and is connected to the transmitting apparatus 140 via the IEEE1394 network 1b. Here, the reversely reproduced image storage device 141 is a storage device, such as a hard disk, in which reversely reproduced images of such formats that are generated according to the first embodiment are stored. A method for storing the reversely reproduced images in the reversely reproduced image storage device 141 will be shown in FIG. 15.

Figure 15:
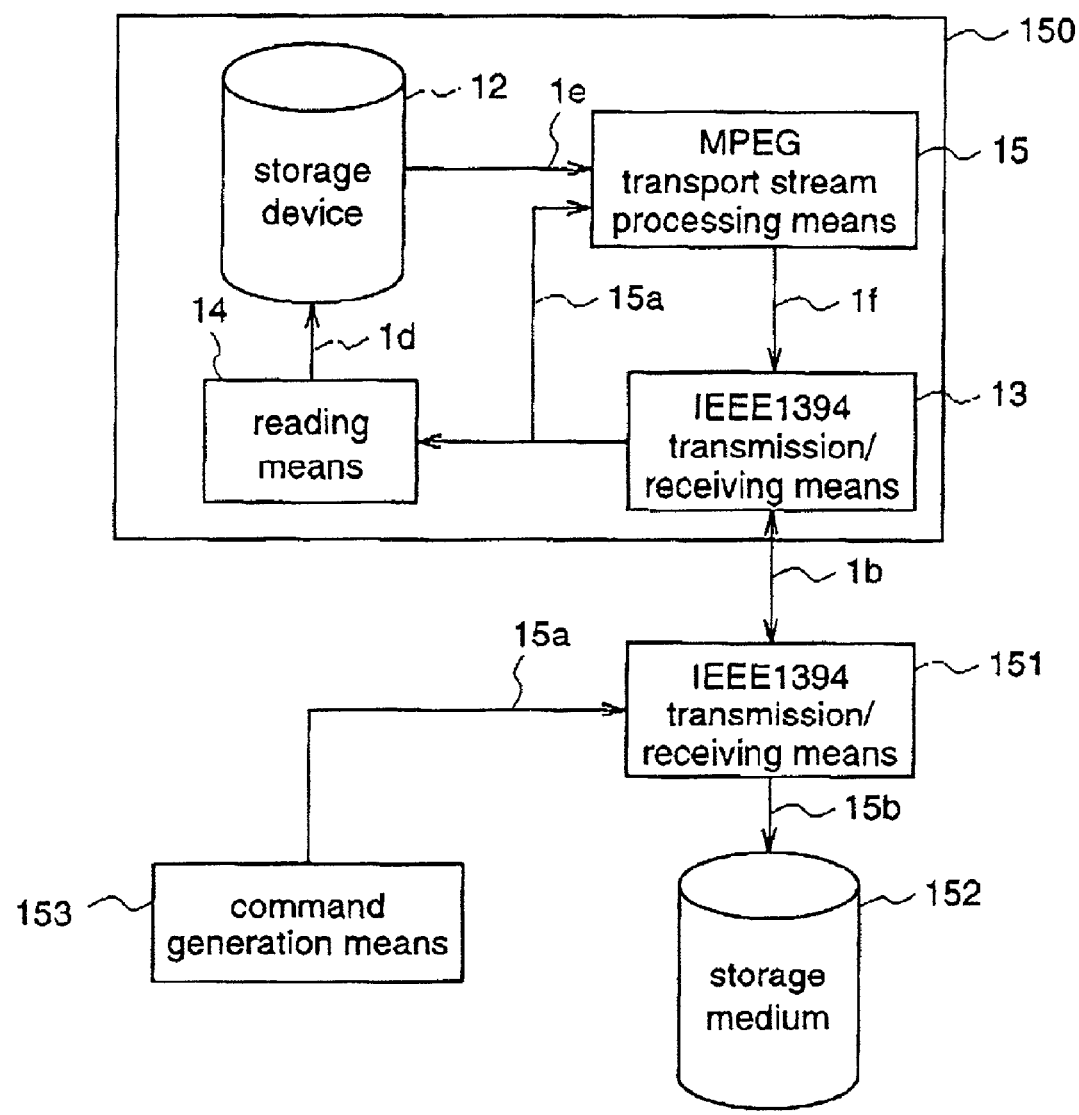
FIG. 15 is a diagram for explaining a method for generating a reversely reproduced image that is stored in a reversely reproduced image storage means in the reproduced image transmitting apparatus according to the second embodiment.

In FIG. 15, a transmission apparatus 150 is the same as the transmission apparatus described in the first embodiment. An IEEE1394 transmission/receiving means 151 is the same as the IEEE1394 transmitting/receiving means 17 in the first embodiment. Numeral 152 denotes a storage medium, such as a hard disk A command generation means 153 is the same as the command generation means 18 in the first embodiment.

Hereinafter, the operation of the transmission apparatus will be described. The command generation means 153 generates a reverse reproduction command 15a, and transmits the reverse reproduction command 15a through the IEEE1394 transmission/receiving means 151 to the IEEE1394 network 1b, to transmit the reverse reproduction command 15a to the transmitting apparatus 150.

At this time, the reverse reproduction command which instructs to reversely reproduce all of I, P, and B pictures is transmitted by using a 1×-speed reverse reproduction command or the like. The reversely reproduced images which are generated by the transmission apparatus 150 are stored in the storage medium 152 through the IEEE1394 network 1b and the IEEE1394 transmission/receiving means 151. The storage medium 152 in which reversely reproduced images corresponding to all of I, P, and B pictures are stored is the reversely reproduced image storage device 141 in FIG. 14.

The reversely reproduced image storage device reading means 142 reads reversely reproduced images which are stored in the reversely reproduced image storage device 141 as required, when the reproduction command 1a requests reverse playback. In the case of forward playback, the reading means 142 properly reproduces only images in which the command A is described.

In the case of reverse playback, since the readout reversely reproduced image has already been subjected to the DSM processing, it is not required to reprocess the image in the transmission apparatus 140. Accordingly, when the transmission apparatus includes the reversely reproduced image storage device 141 in which reversely reproduced images are stored, and the reversely reproduced image storage device reading means 142 for reading these images, reversely reproduced images can be properly obtained even by employing the prior art structure.

According to the second embodiment, reversely reproduced images of all I, P and B pictures are stored in the reversely reproduced image storage device 141 and, when a reverse reproduction command is transmitted from the receiving end, the reversely reproduced image storage device reading means 142 reads the reversely reproduced image and transmits the image data to the receiving end via the IEEE1394 network 1b. Therefore, the reversely reproduced images can be easily obtained on the receiving end.

Embodiment 3

A reproduced image transmitting apparatus according to a third embodiment will be described. FIG. 16 shows another examples of the commands which are processed by the MPEG transport stream processing means 15 in the image transmitting apparatus of the first embodiment, which commands have formats different from those shown in FIG. 10 according to the first embodiment. In FIG. 16, data of trick_mode_control is different from that shown in FIG. 10, and indicates 3'b100. This represents slow_reverse according to ISO/IEC 13818-1, and means slow reverse playback. When trick_mode_control indicates 3'b100, parameter rep_cntrl indicating the number of displays corresponding to the picture is set on lower-order 5 bits. This parameter is set at a value other than zero in the case of the command A, and set at zero in the case of the command B. The commands C and D are not employed.

In the first embodiment, the commands are allocated to an area which is not defined by ISO/IEC 13818-1, while in this third embodiment only the commands A and B are set in an area which is defined by ISO/IEC 13818-1. Accordingly, the reproduction apparatus 16 can dispense with a circuit for controlling the area that is not defined by ISO/IEC 13818-1, thereby reducing the scale of the apparatus. That is, the scale of the apparatus can be reduced by an area corresponding to the MPEG image reproduction means 19 and the reproduction control means 20 in FIG. 1.

Embodiment 4

A reproduced image transmitting apparatus according to a fourth embodiment of the present invention will be described. In the aforementioned first to third embodiments, it is assumed that one PES comprises one picture. However, there are some cases where one PEG comprises plural pictures. In these cases, only by extending codes of DSM as shown in the first to third embodiments, one PES can contain only a description associated with one picture, because the DSM includes only an 8-bit description area. Therefore, the plural pictures included in one PEG cannot be controlled.

In this fourth embodiment, control signals for respective pictures are written in an area corresponding to PEG_private_data in the PEG_header, thereby handling the case where one PES comprises plural pictures.

Figure 17:
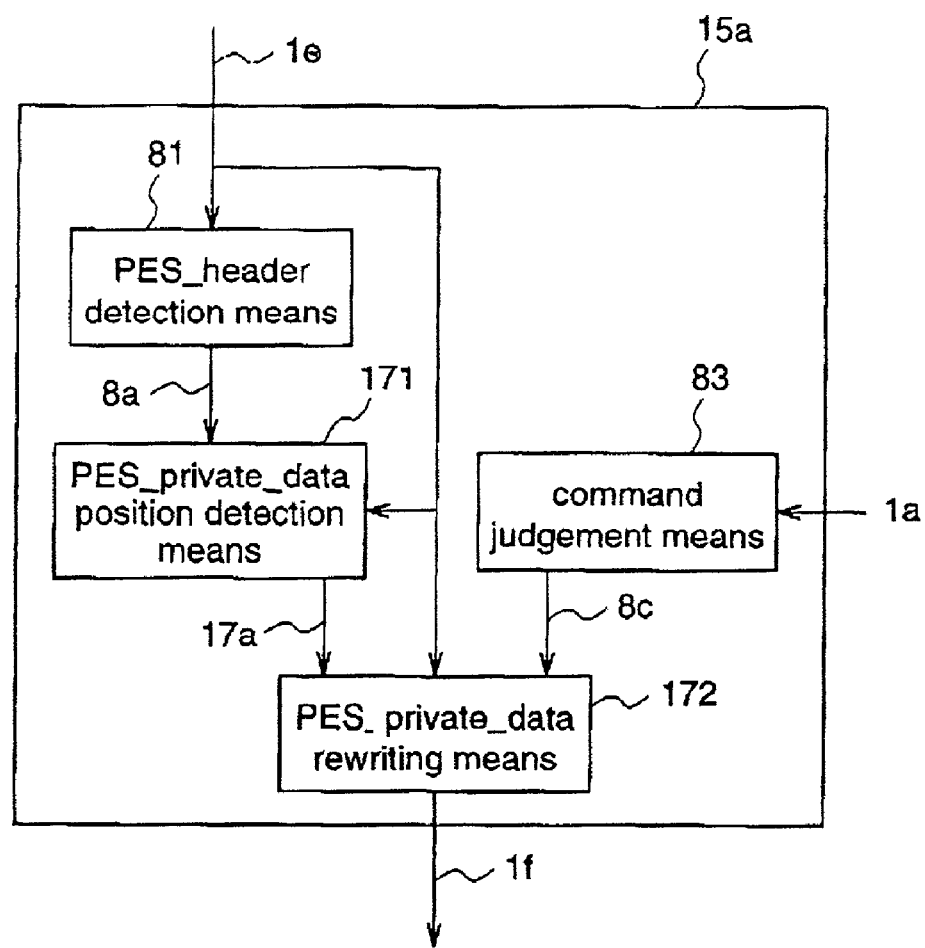
FIG. 17 is a diagram illustrating a structure of an MPEG transport stream processing means in a reproduced image transmitting apparatus according to a fourth embodiment of the present invention.

FIG. 17 is a diagram illustrating a structure of an MPEG transport stream processing means according to the fourth embodiment. In FIG. 17, numeral 171 denotes a PES_private_data position detection means. Numeral 172 denotes a PES_private_data rewriting means. The PES_header detection means 81 and the command judgement means 83 are the same as those shown in FIG. 8. PES_private_data is included in PES_extension in FIG. 9, and defined in ISO/IEC 13818-1, together with PES_extension_field (which will be described later).

The PES_private_data position detection means 171 analyzes the inputted PES_header recognition signal 8a and the readout MPEG transport stream image 1e. When PES_private_data and PES_extension_field are included in the MPEG transport stream image 1e, the detection means 171 detects the position of PES_extension_field and the length of written data, and transmits the same as a PES_private_data recognition signal 17a to the PES_private_data rewriting means 172.

When PES_private_data is included and PES_extension_field is not included in the MPEG transport stream image 1e, the PES_private_data position detection means 17 detects the position in which PES_extension_field is written, and outputs the detected position as the PES_private_data recognition signal 17a to the PES_private_data rewriting means 172.

When PES_private_data is not included in the MPEG transport stream image 1e, the PES_private_data position detection means 171 detects a position in which PES_private_data is written, and transmits the detected position as the PES_private_data recognition signal 17a to the PES_private_data rewriting means 172.

When the PES_private_data recognition signal 17a indicates that PES_private_data and PES_extension_field are included in the MPEG transport stream image 1e, the PES_private_data rewriting means 172 adds a length that is required to describe a control signal for each picture, to the length corresponding to PES_extension_field_length of the readout MPEG transport stream image 1e, thereby to add a control signal for each picture to PES_extension_field. Further, PES_packet_length and PES_header_data_length are rewritten in the same manner as in FIG. 8. An example where the control signals for the respective pictures are described is shown in FIG. 18.

Figure 18:
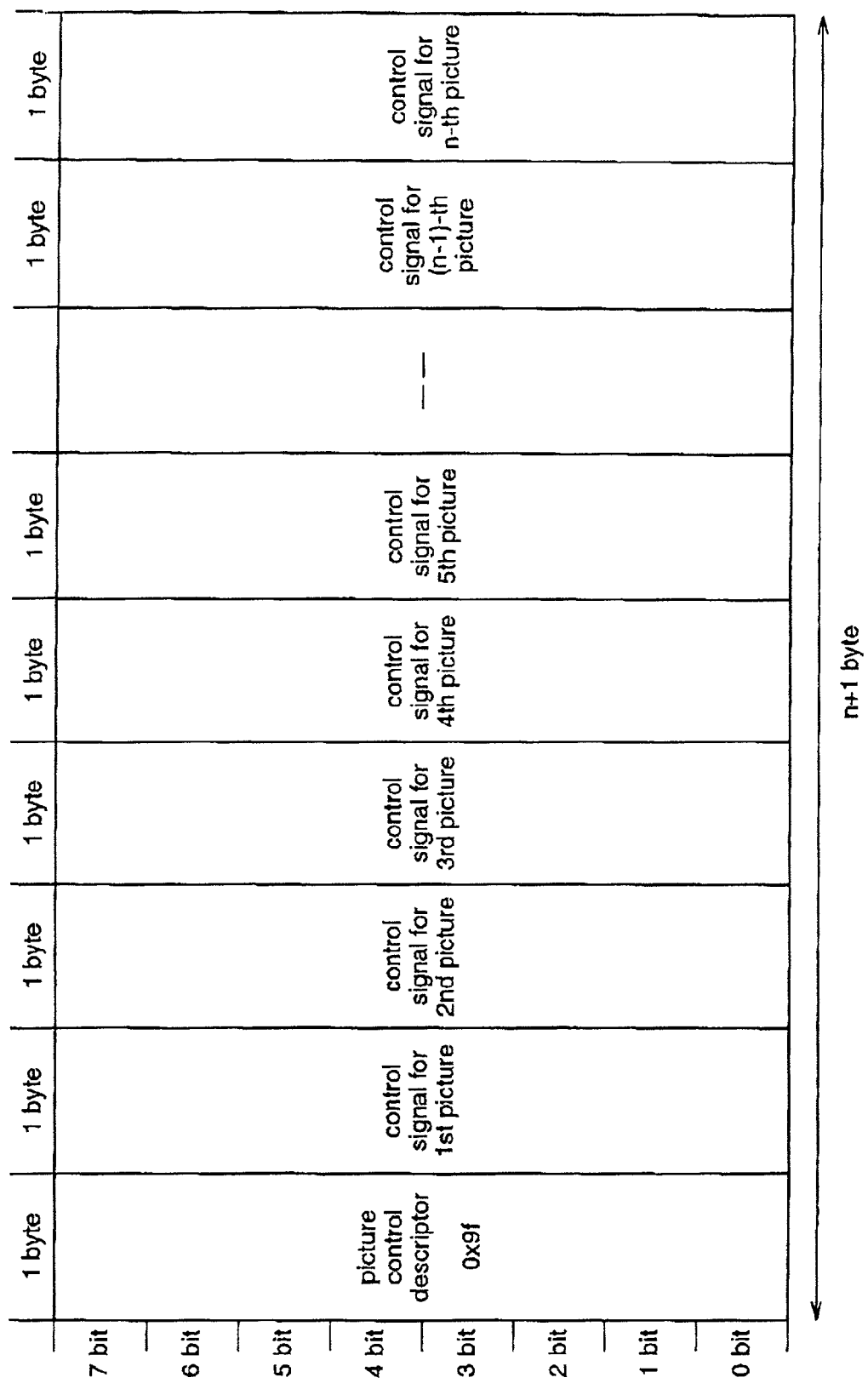
FIG. 18 is a diagram showing an example of a description of control signals corresponding to respective pictures in the reproduced image transmitting apparatus according to the fourth embodiment.

In FIG. 18, it is assumed that the number of pictures included in a PES is "n". A 1-byte descriptor indicating that a picture control signal at the reverse playback is described is located at the head, and 1-byte control signals corresponding to the respective pictures which are included in this PES are described behind the descriptor. The control signal for each picture may be a control signal that is shown in FIGS. 10 or 16. Accordingly, the control signals for all pictures which are included in the PES can be described by the length of (n+1) bytes. Further, when the control signals are described in this manner, the reproduction control means 20 in FIG. 1 is configured to recognize these control signals.

When the PES_private_data recognition signal 17a indicates that PES_private_data is included and PES_extension_field is not included, the PES_private_data rewriting moans 172 sets PES_extension_flag of the readout MPEG transport stream image 1e at 1, adds a length that is required to describe the control signal for each picture, to the length corresponding to PES_extension_field_length, and adds the control signal for each picture in PES_extension_field. In addition, PES_packet_length and PES_header_length are also rewritten in the same manner as in FIG. 8.

From the aforementioned structure, even when one PES comprises plural pictures, the control signals for the respective pictures can be described. This is effective even when one PES comprises one picture.

According to tho fourth embodiment, the control signals for respective pictures are written in the PES_private_data area of PES_header. Therefore, even when one PES comprises plural (n) pictures, the control signals for all of the pictures can be described in the length corresponding to (n+1) bytes, thereby handling the case where one PES comprises plural pictures.

Embodiment 5

Figure 19:
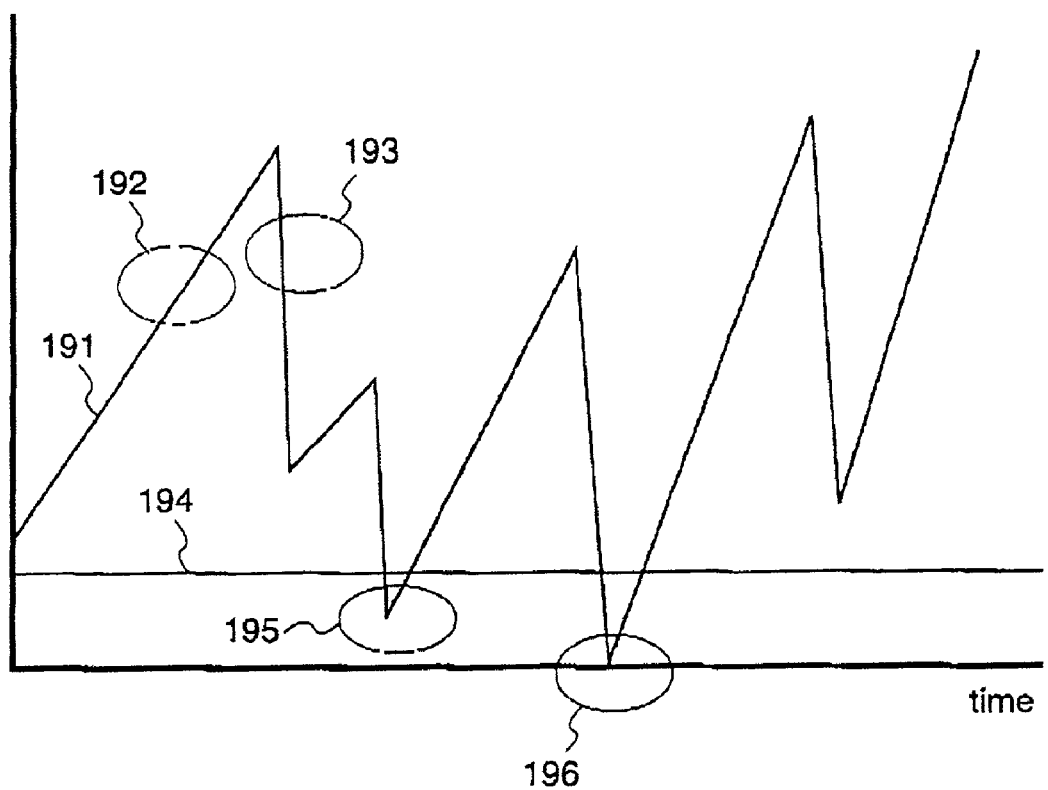
FIG. 19 is a diagram for explaining changes in the amount of image data which are stored in a buffer.

A reproduced image transmitting apparatus according to a fifth embodiment of the present invention will be described. The MPEG decoder 31 in FIG. 13 has a buffer for storing an inputted MPEG transport stream 1g, or a video elementary stream which is extracted from the MPEG transport stream 1g. FIG. 19 shows changes of image data which are stored in the buffer according to time series.

In FIG. 19, the ordinate represents the amount of data stored in the buffer, and the abscissa represent the time. A line 191 shows the changes in the amount of stored data. When the MPEG transport stream 1g is inputted, the amount of data stored in the buffer is increased as shown by a portion 192. As images are decoded, the amount of data stored in the buffer is decreased as shown by a portion 193. However, in the decoding or display of images, there are a possibility that the decoding or display desired by the MPEG decoder 31 is not performed or the reproduction apparatus 16 erroneously operates, unless the buffer contains a predetermined amount of data, except at the initial state. A line 194 shows a lower limit of the amount of stored data in the buffer, which is required for the reproduction apparatus 16 including the MPEG decoder 31 to perform normal reproduction.

In FIG. 19, numeral 195 denotes a state in which data is below the lower limit shown by the line 194. Numeral 196 denotes a state in which the buffer is empty. Assuming that these states are referred to as underflow states, there are some cases where the reproduction apparatus 16 does not operate normally in the underflow states. The underflow does not occur in normal MPEG images, but when pictures which are not continuous are connected with each other by trick play like the reverse playback, the underflow often occurs at a joint part of the connected pictures.

Figure 20:
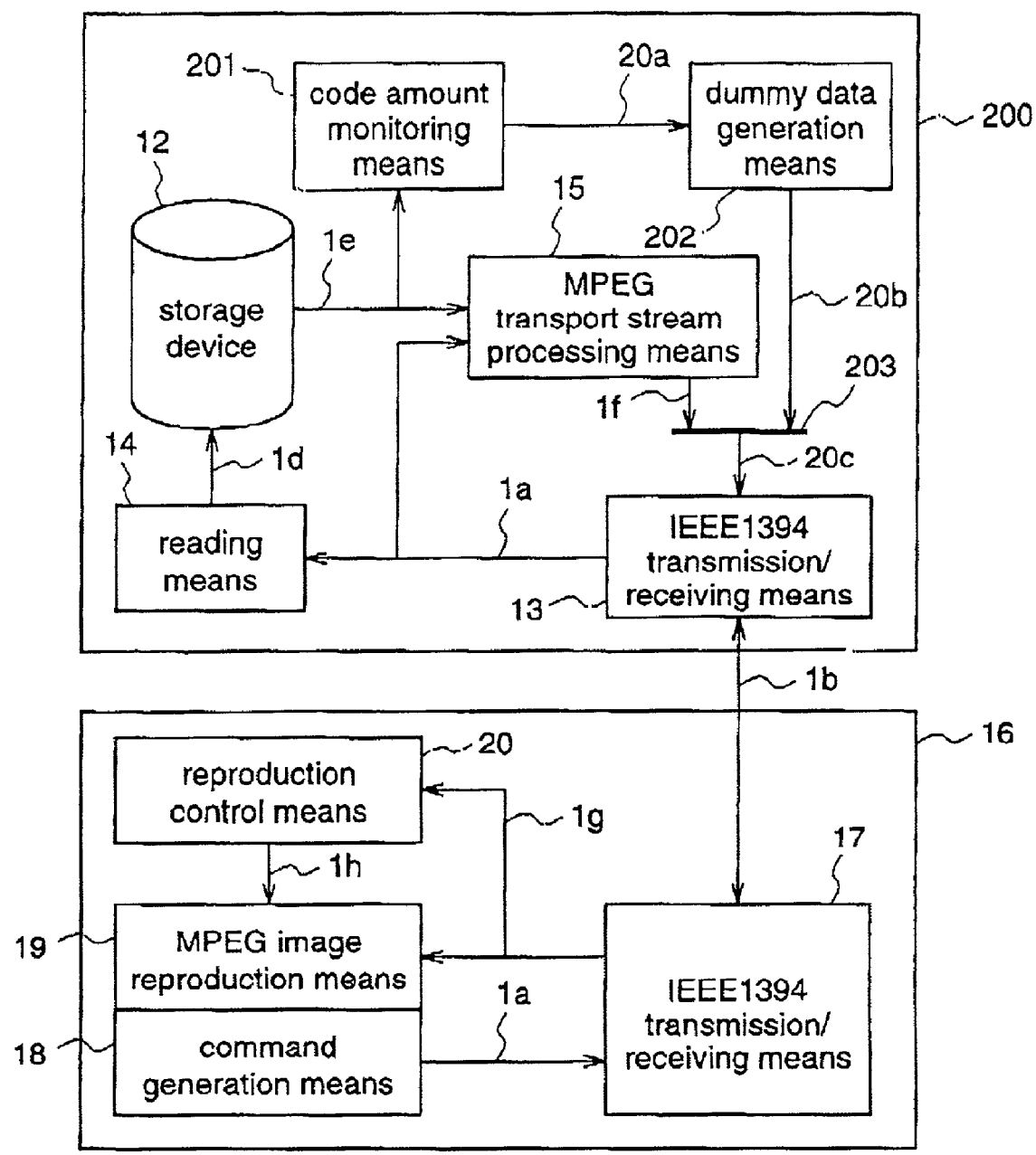
FIG. 20 is a block diagram illustrating a structure of a reproduced image transmitting apparatus according to a fifth embodiment of the present invention.

FIG. 20 shows a structure of a transmission apparatus 200 which is obtained by adding a code amount monitoring means 201, a dummy data generation means 202, and a selector 203 to the transmission apparatus 11 according to the first embodiment, to avoid the aforementioned problem.

In FIG. 20, numeral 200 denotes a transmission apparatus. The code amount monitoring means 201 monitors a code amount of the readout MPEG transport stream image 1e, and checks whether the buffer may turn into the underflow state or not. When the code amount monitoring means 201 decides that the underflow may occur with respect to the readout MPEG transport stream 1e, the monitoring means 201 transmits an underflow occurrence signal 20a to the dummy data generation means 202.

The dummy data generation means 202 generates a dummy packet 20b and transmits the dummy packet 20b to the selector 203 so as to prevent the underflow state. The dummy data generation means 202 generates an MPEG transport stream packet corresponding to a NULL or stuffing packet as the dummy packet 20b, thereby to prevent the underflow of the buffer for the MPEG transport stream, while generating an MPEG transport stream having stuffing data of an MPEG video elementary stream as payload, thereby to prevent the underflow between pictures of the MPEG video elementary stream.

The selector 203 inserts the dummy packet 20b into the processed MPEG transport stream image 1f, said transmits an MPEG transport stream 20c to the IEEE1394 transmission/receiving means 13.

Figure 21:
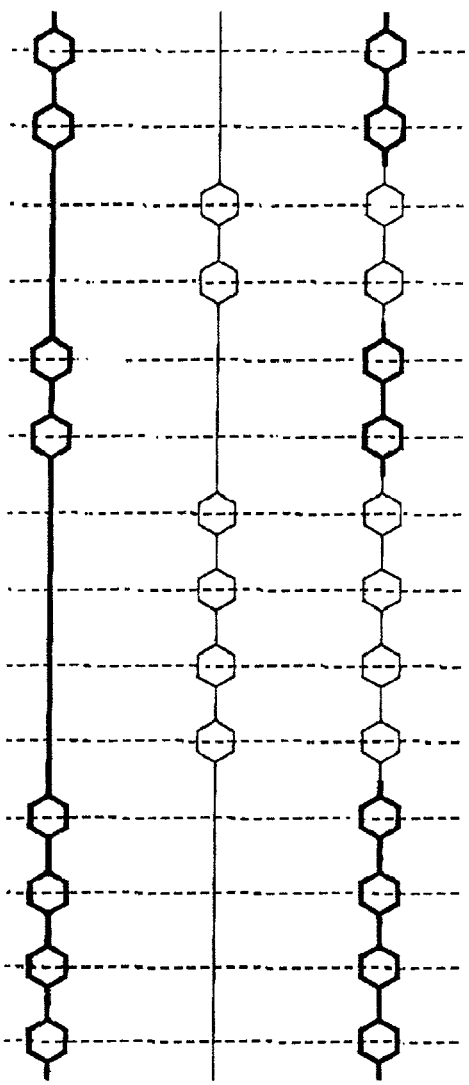
FIGS. 21(a) to 21(c) are diagrams for explaining an operation of a selector which constitutes the reproduced image transmitting apparatus according to the fifth embodiment.

Here, the operation of the selector 203 will be described with reference to FIG. 21. The underflow can be solved by embedding the dummy packets 20b in intervals between packets corresponding to the readout MPEG transport stream image 1e. The selector 203 inserts the dummy packets 20b into the readout MPEG transport stream image 1e so as to shorten the longer intervals between the packets corresponding to the MPEG transport stream image 1e, and transmits the obtained MPEG transport stream 20c.

According to the fifth embodiment, the code amount monitoring means 201 monitors the code amount of the MPEG transport stream image 1e that is read out from the storage device 12 in the transmission apparatus 200. When the underflow state is detected, the dummy data generation means 202 generates the dummy packet 20b so as to prevent the underflow state, and embeds the dummy packet 20b in the MPEG transport stream. Therefore, the underflow in the reproduction apparatus 16 can be avoided, whereby problems that the decoding process is failed and images on the screen freeze or the like can be prevented.

Embodiment 6

Figure 22:
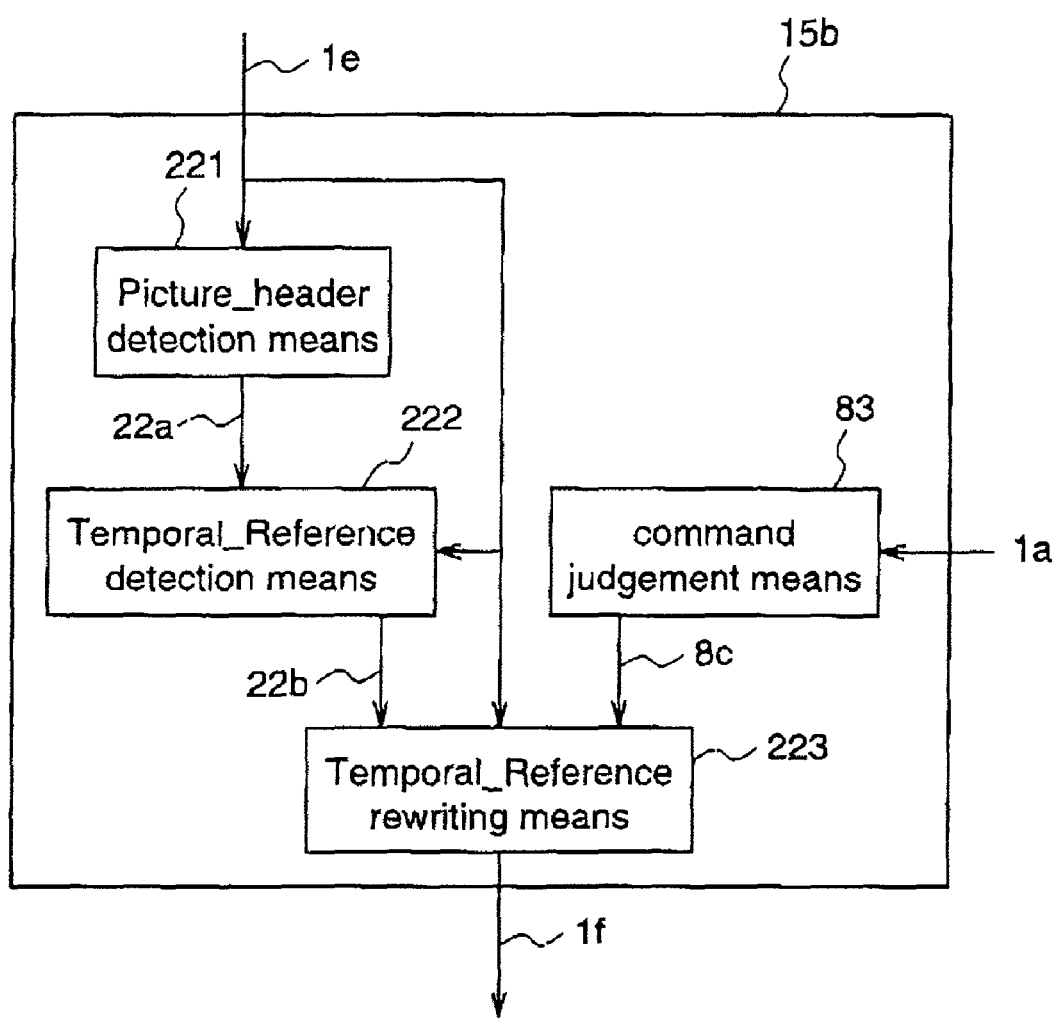
FIG. 22 is a block diagram illustrating a structure of an MPEG transport stream processing means in a reproduced image transmitting apparatus according to a sixth embodiment of the present invention.

A reproduced image transmitting apparatus according to a sixth embodiment of the present invention will be described. FIG. 22 is a block diagram illustrating an MPEG transport stream processing means 15b in the reproduced image transmitting apparatus according to the sixth embodiment. The reproduced image transmitting apparatus of the sixth embodiment is the same as that in the first embodiment, except for the MPEG transport stream processing means 15b. In this sixth embodiment, a Picture_header detection means 221, a Temporal_Reference detection means 222, and a Temporal_Reference rewriting means 223 are provided in the MPEG transport stream processing means as shown in FIG. 17, in place of the PES_header detection means 81, the PES_private_data position detection means 171, and the PES_private_data rewriting means 172, respectively. In this sixth embodiment, control signals for respective pictures are written in an area corresponding to Temporal_Reference included in the picture header that is defined by ISO/IEC 13818-2.

Next, the operation will be described.

When the readout MPEG transport stream 1e is inputted, the Picture_header detection means 221 detects a picture header included in the MPEG transport stream 1e, and transmits a picture header detection signal 22a to the Temporal_Reference detection means 222. When the Temporal_Reference detection means 222 detects the picture header detection signal 22a, the detection means 222 detects the position of Temporal_Reference included in the picture header, and transmits a detection signal 22b indicating the position of Temporal_Reference to the Temporal_Reference rewriting means 223. The Temporal_Reference rewriting means 223 writes a control signal for each picture at the position of Temporal_Reference that is indicated by the detection signal 22b indicating the position of Temporal_Reference.

For example, when decoding is executed and decoded images are to be displayed, the order in which the decoded images are displayed is written in Temporal_Reference. When decoding is executed and decoded images are not to be displayed, a picture display order that is rarely employed for normal images, such as 10'b1111111111 (the 1024th), is given to Temporal_Reference. Accordingly, the control for executing the decoding but not displaying decoded images can be realized. Further, since Temporal_Reference is included in all pictures, also in cases where the position of the PES header is not synchronized with the position of the picture, a decoding signal can be transmitted in units of pictures.

According to the sixth embodiment, the control signals for controlling pictures are written in Temporal_Reference included in Picture_header, and transmitted together with image data to be displayed, in the isochronous transfer mode on the IEEE1394 network. Therefore, also in cases where one PES comprises plural pictures, or the positions of the picture and the PES header are not synchronized with each other, the proper reverse reproduction can be performed.

What is claimed is:

1. A reproduced image transmitting apparatus which transmits reproduced images through a bidirectional network comprising an IEEE1394 interface having two transfer modes, an isochronous transfer mode in which a band is ensured, and an asynchronous transfer mode in which images are transferred asynchronously, comprising:

a data storage means for storing reproduced image data;

a data processing means for processing the reproduced image data which are read from the data storage means so as to transmit the reproduced image data and a reproduction control parameter for controlling reproduction of the reproduced image data, in the isochronous transfer mode, wherein the reproduced image data is an MPEG transport stream, and the reproduction control parameter is associated with an instruction for decoding and displaying processes for the MPEG transport stream; and a control signal for controlling reverse reproduction of images, the control signal embedded in unused parts of the MPEG transport stream.

2. The reproduced image transmitting apparatus of claim 1, wherein the reproduction control parameter is embedded in a part of the reproduction image data.

* * * * *